(12) United States Patent
Morgan, III et al.

(10) Patent No.: US 6,756,989 B1
(45) Date of Patent: Jun. 29, 2004

(54) METHOD, SYSTEM, AND COMPUTER PROGRAM PRODUCT FOR FILTERING A TEXTURE APPLIED TO A SURFACE OF A COMPUTER GENERATED OBJECT

(75) Inventors: David L. Morgan, III, Mountain View, CA (US); Angus M. Dorbie, Mountain View, CA (US); Frederic J. Noraz, Vence (FR)

(73) Assignee: Microsoft Corporation, Redmond, WA (US)

( * ) Notice: Subject to any disclaimer, the term of this patent is extended or adjusted under 35 U.S.C. 154(b) by 268 days.

(21) Appl. No.: 09/684,810

(22) Filed: Oct. 10, 2000

Related U.S. Application Data

(60) Provisional application No. 60/227,940, filed on Aug. 25, 2000.

(51) Int. Cl.[7] .................................................. G09G 5/07
(52) U.S. Cl. ........................ 345/582; 345/587; 345/606; 345/607; 345/608; 345/609; 345/611; 345/629
(58) Field of Search ................................. 345/582, 587, 345/606, 607, 608, 609, 611, 629

(56) References Cited

U.S. PATENT DOCUMENTS

| | | | | |
|---|---|---|---|---|
| 5,222,205 A | * | 6/1993 | Larson et al. ................ | 345/587 |
| 6,005,582 A | * | 12/1999 | Gabriel et al. ............... | 345/586 |
| 6,040,837 A | * | 3/2000 | Wong et al. ................. | 345/586 |

OTHER PUBLICATIONS

IEEE, Computer Graphics and Applications, May 1996, pp. 34–35.*

Statement of Facts Concerning Certain Marketing Activities by Silicon Graphics, Inc.

Hüttner et al., "Fast Footprint MIPmapping," *1999 Eurographics/SIGGRAPH Workshop on Graphics Hardware*, ACM, Inc., Los Angeles, California, Aug. 1999, pp. 35–43.

Schilling et al., "Texram: A Smart Memory for Texturing," *IEEE Computer Graphics and Applications*, vol. 16, No. 3, IEEE, May 1996, pp. 32–41.

*3D XTC—Articles—In–Depth Anisotropic Filtering* (visited Jun. 22, 2000) <http://home1.swipnet.se/~w-12597/3dxtc/articles/anisotropic/htm>, 13 pages.

*Anisotropic Texture Filtering*, (visited Jun. 1, 2000) <http://msdn.microsoft.com/library/psdk/directx/imover_5ack.htm>, 1 page.

*ATI Technologies, Inc.—Hardware Technology*, (visited Jan. 22, 2001) <http://www.ati/.com/na/pages/technology/hardware/radeon/techspecs.html>, table of contents (2 pages) and all hyperlinks (34 pages).

(List continued on next page.)

Primary Examiner—Matthew C. Bella
Assistant Examiner—Manucher Rahmjoo
(74) Attorney, Agent, or Firm—Woodcock Washburn LLP

(57) ABSTRACT

A method, system, and computer program product for filtering textures applied to a surface of a computer generated object permits an application program running on a computer system to significantly increase the graphics capabilities and performance of the computer. Rendering data for a pixel of the object is received from the application program, and a first and second set of texture coordinates is generated. Next, the first and second sets of texture coordinates are used to obtain a first and second texture sample from a texture image. The first and second texture samples are then blended together to produce a texture sample having a greater degree of filtering. This produced texture sample having a higher degree of filtering is stored in a frame buffer for subsequent display. The filtering process of the present invention can be performed either by conducting multiple passes through a graphics pipeline having a single texture unit or by conducting one pass through a graphics pipeline having multiple texture units. The filtering process of the present invention can also be performed by conducting multiple passes through a graphics pipeline having multiple texture units.

20 Claims, 10 Drawing Sheets

OTHER PUBLICATIONS

Barkans, A.C., "High–Quality Rendering Using the Talisman Architecture," 1997 *SIGGRAPH/Eurographics Workshop on Graphics Hardware,* ACM, Inc., New York City, Aug. 1997, pp. 79–88.

Cant, R.J. and Shrubsole, P.A., "Texture Potential MIP Mapping, a New High–Quality Texture Antialiasing Algorithm," *ACM Transactions on Graphics,* vol. 19, No. 3, ACM, Inc., Jul. 2000, pp. 164–184.

Cook, R.L., "Stochastic Sampling in Computer Graphics," *ACM Transactions on Graphics,* vol. 5, No. 1, ACM, Inc., Jan. 1986, pp. 51–72.

Crow, F.C., "Summed–Area Tables for Texture Mapping," *Computer Graphics (Proceedings of SIGGRAPH 84)*, vol. 18, No. 3, ACM, Inc., Minneapolis, Minnesota, Jul. 1984, pp. 207–212.

Dippé, M.A.Z. and Wold, E.H., "Antialiasing Through Stochastic Sampling," *Computer Graphics (Proceedings of SIGGRAPH 85)*, vol. 19, No. 3, ACM, Inc., San Francisco, California, Jul. 1985, pp. 69–78.

Everitt, C., "Anisotropic Texture Filtering in Open GL," NVIDIA White Paper, <http://www.cfxweb.net/files/Detailed/252.shtml>, Jul. 2000 (6 pages).

Flavell, Andrew, *Gamasutra, vol. 2, Issue 48—Run Time MIP–Map Filtering—MIP–Mapping Basics,* <http://www.gamasutra.com/features/programming/19981211/mipmap03.htm>, (2 pages), (visited Jun. 1, 2000).

Flavell, Andrew, *Gamasutra, vol. 2, Issue 48—Run Time MIP–Map Filtering—Applying MIP–Maps at Run Time,* <http://www.gamasutra.com/features/programming/19981211/mipmap04.htm>, (2 pages), (visited Jun. 1, 2000). flavell.txt, <ftp://ftp.mfi.com/pub/gamedev/src/nov98.zip>, code pertaining to Document No. AS4, 18 pages, (visited Jun. 1, 2000).

Flavell, Andrew, *Gamasutra, vol. 2, Issue 48—Run Time MIP–Map Filtering—Applying MIP–Maps at Run Time,* <http://www.gamasutra.com/features/programming/19981211/mipmap05.htm>, (2 pages), (visited Jun. 1, 2000).

Flavell, Andrew, *Gamasutra, vol. 2, Issue 48—Run Time MIP–Map Filtering—Per–pixel MIP–Mapping,* <http://www.gamasutra.com/features/programming/19981211/mipmap07.htm>, (7 pages), (visited Jun. 1, 2000).

Flavell, Andrew, *Gamasutra, vol. 2, Issue 48—Run Time MIP–Map Filtering—Closing Remarks/Acknowledgements,* <http://www.gamasutra.com/features/programming/19981211/mipmap08.htm>, (2 pages), (visited Jun. 1, 2000).

Fournier, A. and Fiume, E., "Constant–Time Filtering with Space–Variant Kernels," *Computer Graphics (Proceedings of SIGGRAPH 88)*, vol. 22, No. 4, ACM, Inc., Atlanta, Georgia, Aug. 1988, pp. 229–238.

Heckbert, P.S., "Fundamentals of Texture Mapping and Image Warping," Master's Thesis, Department of Electrical Engineering and Computer Science, University of California, Berkeley, Jun. 1989 (89 pages).

Heckbert, P.S., "Survey of Texture Mapping," *IEEE Computer Graphics & Applications,* vol. 6, No. 11, IEEE, Inc., Nov. 1986, pp. 56–67.

Lansdale, R.C., "Texture Mapping and Resampling for Computer Graphics," Master's Thesis, Department of Electrical Engineering, University of Toronto, Jan. 1991 (195 pages).

*Linear Texture Filtering,* <http://msdn.microsoft.com/library/psdk/directx/imover_5f10.htm>, (1 page), (visited Jun. 1, 2000).

McCormack, J. et al., "Feline: Fast Elliptical Lines for Anisotropic Texture Mapping," *Computer Graphics (Proceedings of SIGGRAPH 99)*, ACM, Inc., Los Angeles, California, Aug. 1999, pp. 243–250.

Mitchell, D.P., "Generating Antialiased Images at Low Sampling Densities," *Computer Graphics (Proceedings of SIGGRAPH 87)*, vol. 21, No. 4, ACM, Inc., Anaheim, California, Jul. 1987, pp. 65–72.

*Nearest Point Sampling,* (visited Jun. 1, 2000) <http:/msdn.microsoft.com/library/psdk/directx/imover_8gv8.htm>, (2 pages).

OpenGL ARB, Extension Specification Documents, <http://oss.sgi.com/projects/ogl–sample/registry>, 2000 (4 pages).

Pavlidis, T., Letter to the Editor, *ACM Transactions on Graphics,* vol. 9, No. 2, ACM, Inc., Apr. 1990, pp. 233–236.

Schilling, A. et al., "Texram: A Smart Memory for Texturing," *IEEE Computer Graphics and Applications,* vol. 16, No. 3, IEEE, Inc., May 1996, pp. 32–41.

Segal, M. et al., "The OpenGL Graphics System: A Specification (Version 1.1)," Silicon Graphics, Inc., <http://herakles.zcu.cz/local/manuals/OpenGl/glspec1.1/glspec.html>, (Table of Contents, 4 pages), 1997.

*Texture Filtering,* (visited Jun. 1, 2000) <http://msdn.microsoft.com/library/psdk/directx/imover_9db8.htm>, (1 page).

*Unsolved Problems and Opportunities for High–Quality, High–Performance 3–D Graphics on a PC Platform,* (visited Jun. 25, 2001), <http://wwww.merl.com/hwws98/presentation/kirk>, which includes a table of contents (4 pages) and hyperlinks which include a paper copy of a slide presentation distributed at *Eurographics/Siggraph Graphics Hardware Workshop,* Aug. 1998, (68 sheets); published on Web Sep. 17, 1998.

*What is a Mipmap?,* (visited Jun. 1, 2000) <http://msdn.microsoft.com/library/psdk/directx/imover_4en8.htm>, (2 pages).

Williams, L., "Pyramidal Parametrics," *Computer Graphics (Proceedings of SIGGRAPH 83)*, vol. 17, No. 3, ACM, Inc., Detroit, Michigan, Jul. 1983, pp. 1–11.

Wold, E. and Pepard, K., Re: Comments on "Stochastic Sampling in Computer Graphics," *ACM Transactions on Graphics,* vol. 9, No. 2, ACM, Inc., 1990, pp. 237–243.

\* cited by examiner

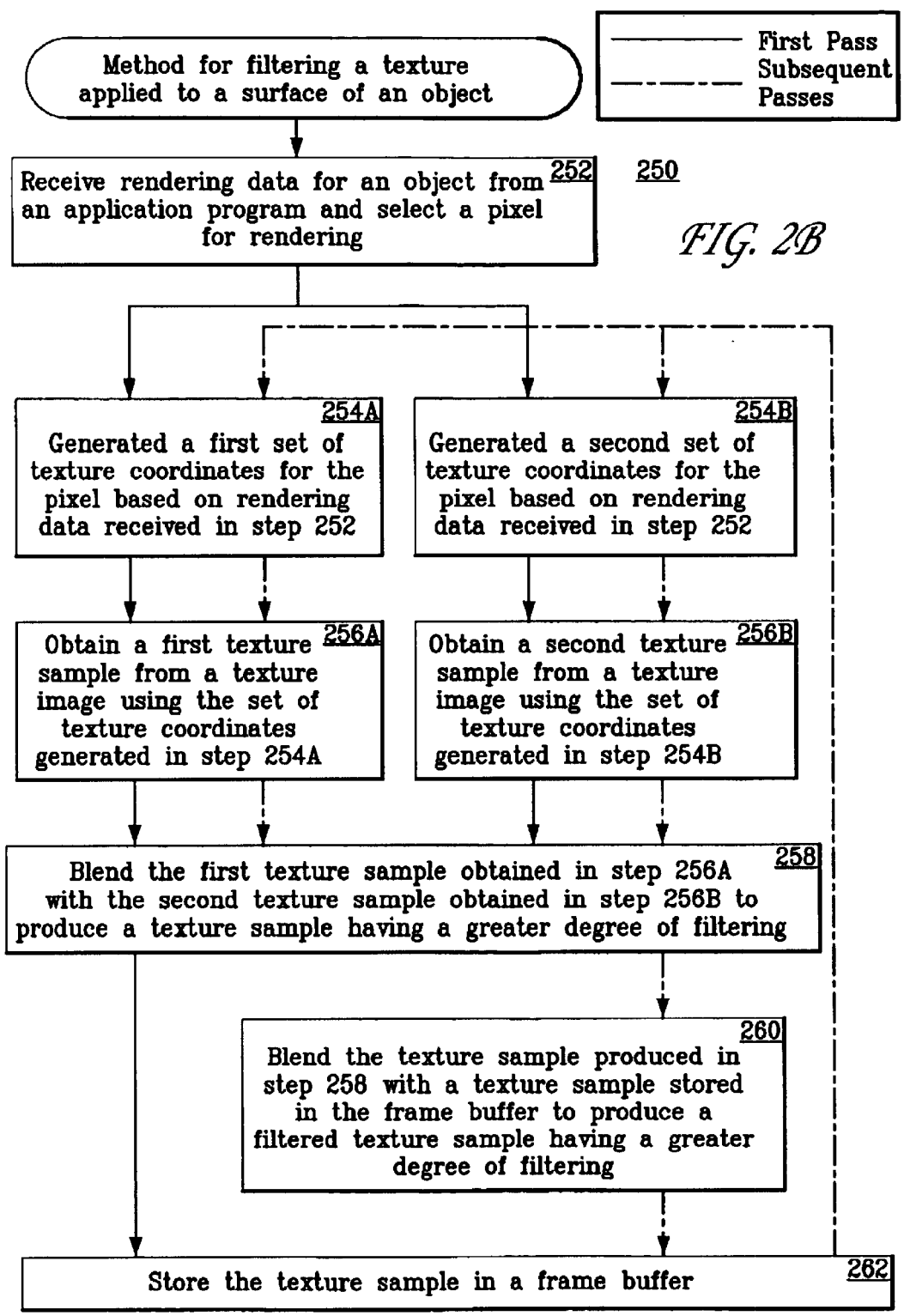

METHOD, SYSTEM, AND COMPUTER PROGRAM PRODUCT FOR FILTERING A TEXTURE APPLIED TO A SURFACE OF A COMPUTER GENERATED OBJECT

CROSS REFERENCE TO RELATED APPLICATIONS

This application is related to and claims priority to U.S. Provisional Application Ser. No. 60/227,940, filed Aug. 25, 2000, titled "Method, System, and Computer Program Product for Filtering a Texture Applied to a Surface of a Computer Generated Object," which is herein incorporated by reference in its entirety.

BACKGROUND OF THE INVENTION

1. Field of the Invention

The present invention relates to computer graphics. More particularly, the present invention relates to methods, systems, and computer program products for filtering textures applied to a surface of a computer-generated object.

2. Related Art

Applying textures to the surfaces of computer generated objects greatly enhances the visual realism of a computer generated image or computer scene. As would be known to a person skilled in the relevant computer graphics art, it is very difficult to model intricate surface details of objects using geometric primitives or polygons (e.g., triangles). This difficulty however can be overcome in many instances by a process known in the relevant art as texture mapping.

The process of texture mapping involves mapping or applying a texture image to a surface of a computer-generated object or graphical model as the object is rendered. More particularly, the process of texture mapping involves sampling intensity data (i.e., texels) of a texture image during the rendering of a computer scene. The sampled texels of the texture image are used to generate pixel intensity values or color for the pixels of the final computer scene.

While the process of texture mapping has many benefits, it also has some undesirable effects. For example, one undesirable effect produced by the process of texture mapping is a form of image distortion known in the relevant art as aliasing. Aliasing is caused by the use of rendering techniques that assign an intensity value or color of a primitive or texture sample being rendered to a pixel of the final computer scene, regardless of whether the primitive or texture sample covers all or only a portion of the pixel of the final scene. Aliasing results in computer scenes that have jagged edges.

In real time graphics systems, aliasing is a particularly significant problem. Because real time graphics systems must compute all the pixels of a computer scene in a very short, fixed duration of time, real time graphics systems make approximations in both the size and shape of the area of a texture image that should be sampled during rendering. The area of the texture image sampled during rendering (commonly referred to in the relevant computer graphics art as a filter footprint) defines which texels of the texture image are used to compute the intensity values of the pixels of the computer scene. These approximations add distortion to the final computer scene.

In order to reduce the amount of aliasing that results from the process of texture mapping, some computers are equipped with specially designed graphics hardware that allows pre-filtered texture images (called MIP-Maps) to be stored in a texture memory and accessed during the rendering of a computer scene. Using pre-filtered texture images to render a computer scene helps to eliminate some of the image artifacts caused by texture mapping, and it shortens the amount of time needed to render a computer scene. Some of the known available features of specially designed graphics hardware include the ability to perform bilinear and/or trilinear filtering of texture images during the rendering of a computer scene. Another feature known as anisotropic filtering is described in a recent U.S. Patent to Gabriel et al., titled "Method and System for Texture Mapping Images with Anisotropic Filtering," which is incorporated in its entirety herein by reference. As would be known to a person skilled in the relevant art, however, available graphics hardware, including available specially designed graphics hardware, has many limitations.

What is needed is a new method for filtering textures that overcomes the deficiencies and limitations discussed above.

SUMMARY OF THE INVENTION

The present invention provides a method, system, and computer program product for filtering textures applied to a surface of a computer-generated object. The filtering process of the present invention can be performed either by conducting multiple passes through a graphics pipeline having a single texture unit or by conducting one pass through a graphics pipeline having multiple texture units. The filtering process of the present invention can also be performed by conducting multiple passes through a graphics pipeline having multiple texture units.

In one embodiment, the filtering process is performed by conducting at least two passes through a graphics pipeline having a single texture unit. In this embodiment, during a first pass through the graphics pipeline, rendering data is received for an object from an application program, a first set of texture coordinates for a pixel of the object is generated, a first filtered texture sample from a texture image is obtained based on the first set of texture coordinates, and the first filtered texture sample is stored in a frame buffer. During a second pass through the graphics pipeline, a second set of texture coordinates is generated for the pixel of the object being rendered, a second filtered texture sample from the texture image is obtained based on the second set of texture coordinates, and the second filtered texture sample is blended with the first filtered texture sample to produce, for example, an anisotropicly filtered pixel. The anisotropicly filtered pixel is stored in the frame buffer. The second set of texture coordinates (and therefore the obtained filtered texture sample) is offset from the first set of texture coordinates. The steps of this embodiment can be repeated, if necessary, to achieve greater degrees of filtering.

In another embodiment, the filtering process according to the present invention is performed during a single pass through a graphics pipeline having multiple texture units. In this embodiment, rendering data is received for an object or a graphics primitive from an application program. Next, a first and a second set of texture coordinates are generated for a pixel of the object. A first texture unit is used to obtain a first filtered texture sample from the texture image based on the first set of texture coordinates. A second texture unit, operating in parallel with the first texture unit, is used to obtain a second filtered texture sample from the texture image based on the second set of texture coordinates. The first and second filtered texture samples are then blended to produce, for example, an anisotropicly filtered pixel. The anisotropicly filtered pixel is stored in a frame buffer. The steps of this embodiment can be repeated, if necessary, or graphics subsystems having more than two texture units can be used, to support greater degrees of filtering.

In the embodiments above, the location of each set of texture coordinates is displaced from the others sets of texture coordinates based upon projected screen space derivatives to more accurately assemble the texel footprint. The computation of the delta positions for each set of texture coordinates can be performed by a software application program, by middleware, or by graphics driver software or hardware.

Various features and advantages of the present invention, as well as the structure and operation of various embodiments of the present invention, are described in detail below with reference to the accompanying figures.

BRIEF DESCRIPTION OF THE FIGURES

The accompanying figures, which are incorporated herein and form part of the specification, illustrate the present invention and, together with the description, further serve to explain the principles of the invention and to enable a person skilled in the relevant art to make and use the invention.

FIG. 2B illustrates a second example method according to an embodiment of the present invention;

The present invention is described with reference to the accompanying figures. In the figures, like reference numbers indicate identical or functionally similar elements. Additionally, the leftmost digit of a reference number identifies the figure in which the reference number first appears.

DETAILED DESCRIPTION OF THE PREFERRED EMBODIMENTS

The present invention provides a method, system, and computer program product for filtering textures applied to a surface of a computer-generated object. The filtering process of the present invention can be performed either by conducting multiple passes through a graphics pipeline having a single texture unit or by conducting one pass through a graphics pipeline having multiple texture units. The filtering process of the present invention can also be performed by conducting multiple passes through a graphics pipeline having multiple texture units.

Terminology

As used herein, the term "image" or "scene" means an array of pixels. A typical image might have red, green, blue, and alpha pixel data, or other type pixel data information as known to a person skilled in the relevant art.

The term pixel means a data structure, which is used to represent a picture element. Any type of pixel format can be used.

The term "texture image" means an array of texels or intensity values. A texture image can be any array of values that is used to determine a value for a pixel. As used herein, the term "texture image" includes texture maps, bump maps, environmental maps, et cetera.

The term "texel" means a texture element.

The term "texture sample" means one or more texels blended together to form a filtered texel. Different weighting factors can be used for each texel blended together to form a filtered texel. The terms "texel" and "texture sample" are sometimes used interchangeably.

The term "texture unit" refers to graphics hardware, firmware, and/or software that can be used to obtain a texture sample (e.g., a point sample, bilinearly filtered texture sample, or a trilinearly filtered texture sample) from a texture image.

The term "real time" refers to a rate at which successive display images can be redrawn without undue delay upon a user or application. This interactive rate can include, but is not limited to, a rate equal to or less than approximately 120 milliseconds. In one preferred example, an interactive rate is equal to or less than 60 milliseconds. In some examples, real time can be one update per second.

Example Architecture of the Invention

Figure 1:
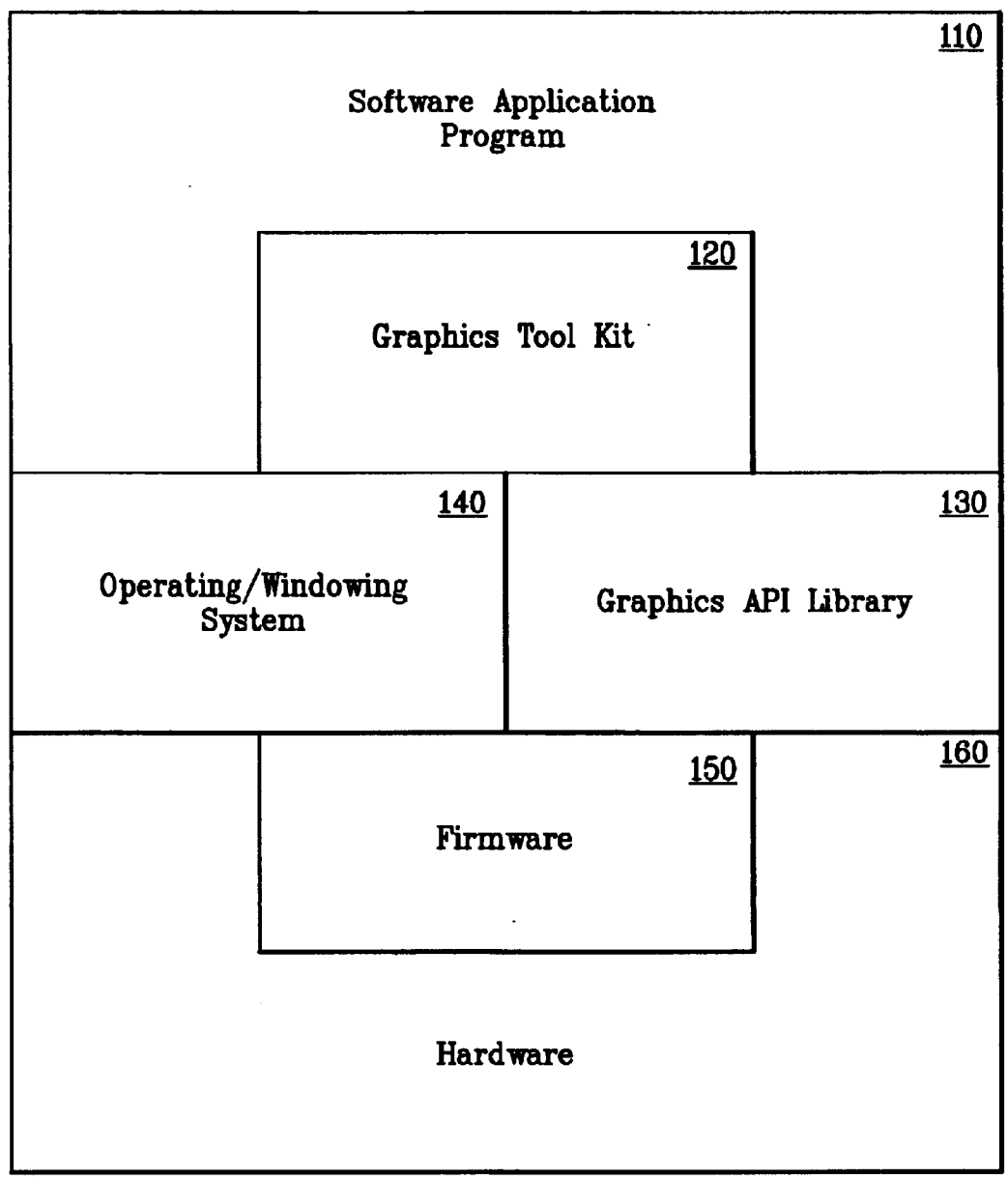
FIG. 1 illustrates an example architecture according to an embodiment of the present invention.

It is a feature of the present invention that it may be implemented in many different ways, in many environments, and on many different computers or computer-like systems. For example, FIG. 1 illustrates a block diagram of an example computer graphics architecture 100 in which the present invention can be implemented. As would be apparent to a person skilled in the relevant art given the description herein, the present invention can be implemented in any one of the layers 110–160 of architecture 100, or in any combination of layers 110–160 of architecture 100. In a preferred embodiment, the invention is implemented as a graphics application program interface (API) that resides in layer 130.

Architecture 100 includes six overlapping layers. Layer 110 represents a high level software application program. Layer 120 represents a three-dimensional (3D) graphics software tool kit, such as OPEN INVENTOR. Layer 130 represents a graphics API, which can include but is not limited to OPENGL, Lay 140 represents system support such as operating system and/or windowing system support. Layer 150 represents firmware. Finally, layer 160 represents hardware, including graphics hardware. Hardware 160 can be any hardware, graphics hardware, or graphics pipeline including, but not limited to, a computer graphics processor (single chip or multiple chip), a specially designed computer, an interactive graphics machine, a gaming platform, a low end game system, a game console, a network architecture, et cetera. Some or all of the layers 110–160 of architecture 100 will be available in any computer or computer-like system.

Example Embodiments of the Present Invention

Figure 2A:
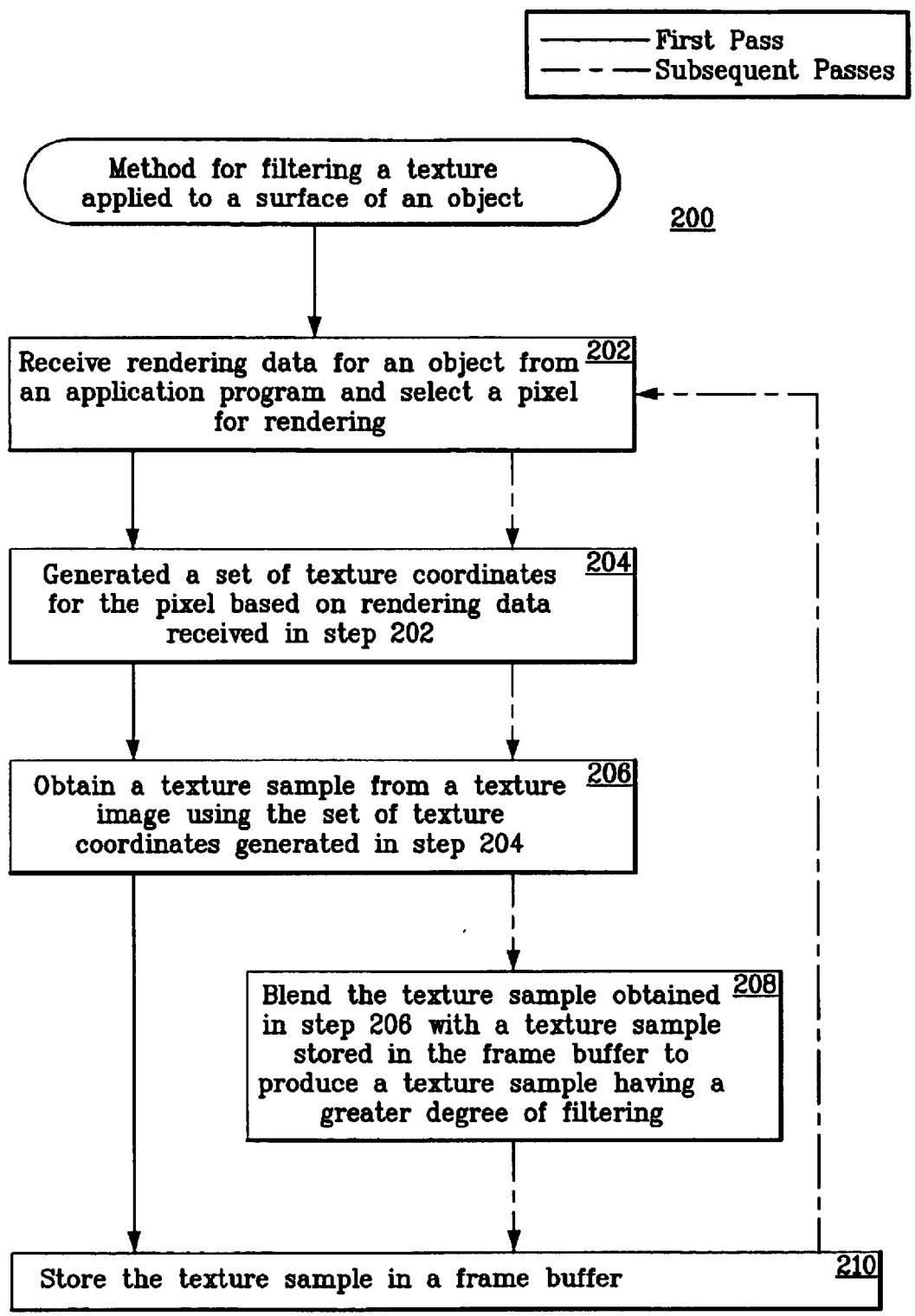
FIG. 2A illustrates a first example method according to an embodiment of the present invention.

FIGS. 2A and 2B illustrate example methods for filtering a texture applied to a surface of a computer generated object according to the present invention. The description that follows teaches one skilled in the relevant art how to implement various embodiments of the present invention by describing how to filter the texture of texture image 300, shown in FIG. 3, and apply the filtered texture to the surfaces of object 400, shown in FIG. 4, to produce image 500, shown in FIG. 5. In particular, the description that follows teaches one skilled in the relevant art how to perform anisotropic filtering according to the present invention and apply the filtered texture to the surfaces of object 400. As described herein, the present invention can also be used to perform bilinear and trilinear filtering.

As will become known to a person skilled in the relevant art given the description herein, one of the features of the present invention is that it permits any application running on a computer system to significantly increase the performance of the systems graphics hardware. How much the graphical performance of the system is increased is under the control of the application program (i.e., under the control of the programmer and/or the user of the application program via graphical user interface prompts). Thus, the present invention gives application programmers and users freedom to choose between speed of execution and image quality.

Figure 5:
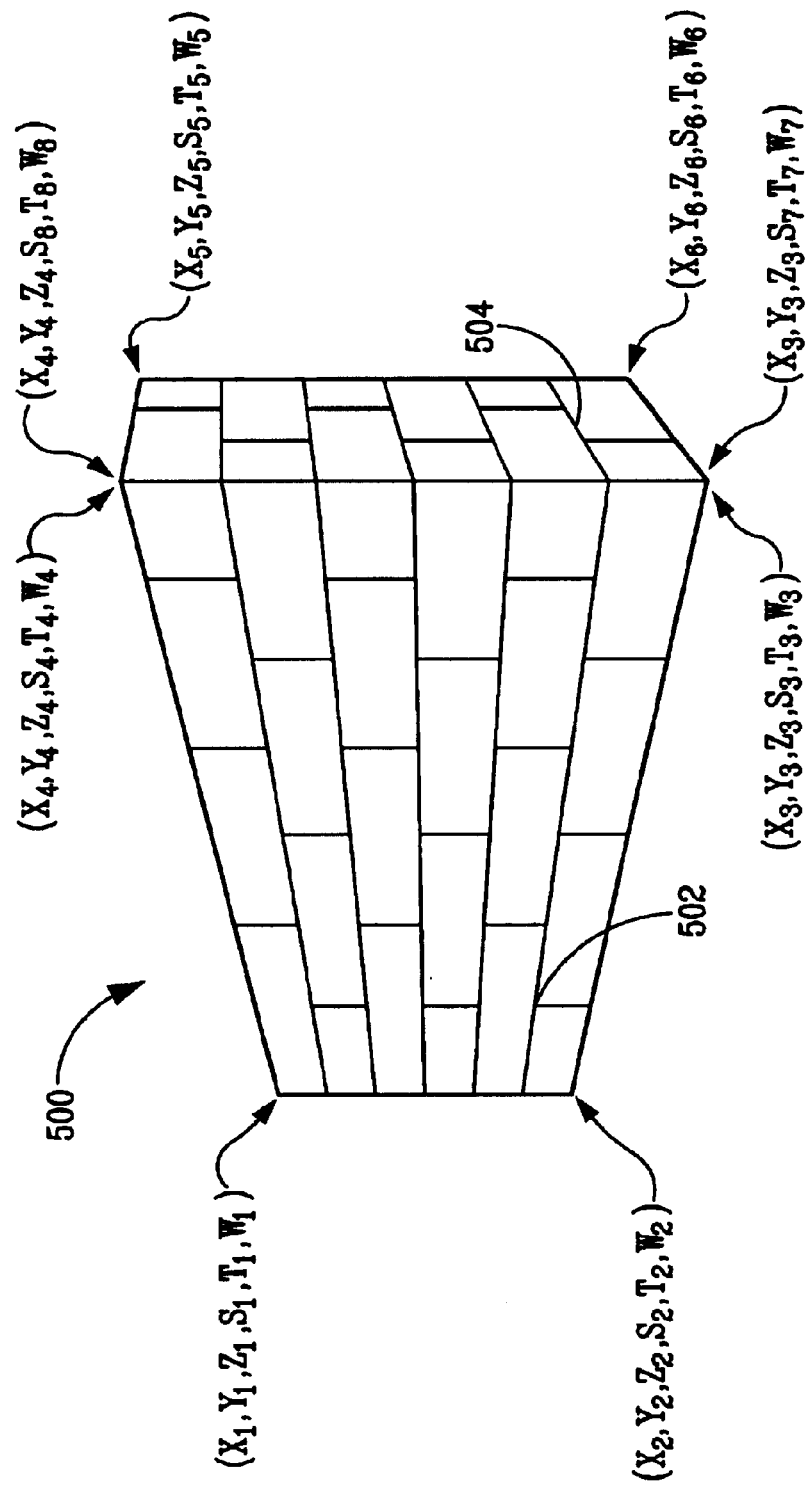
FIG. 5 illustrates an example texture image applied to the surfaces of a computer generated object according to an embodiment of the present invention.
Figure 8:
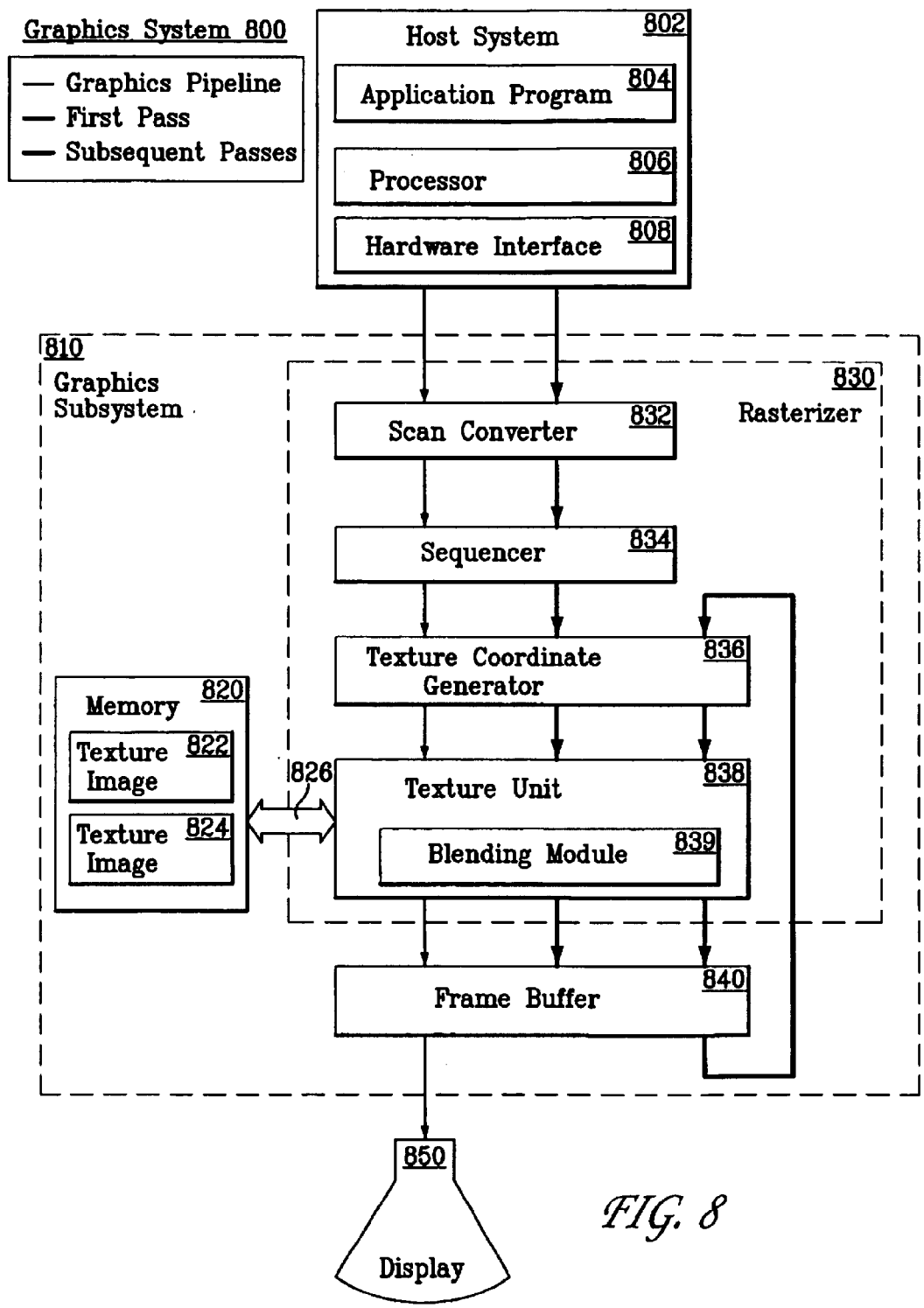
FIG. 8 illustrates an example graphics pipeline having a single texture unit according to an embodiment of the present invention.
Figure 9:
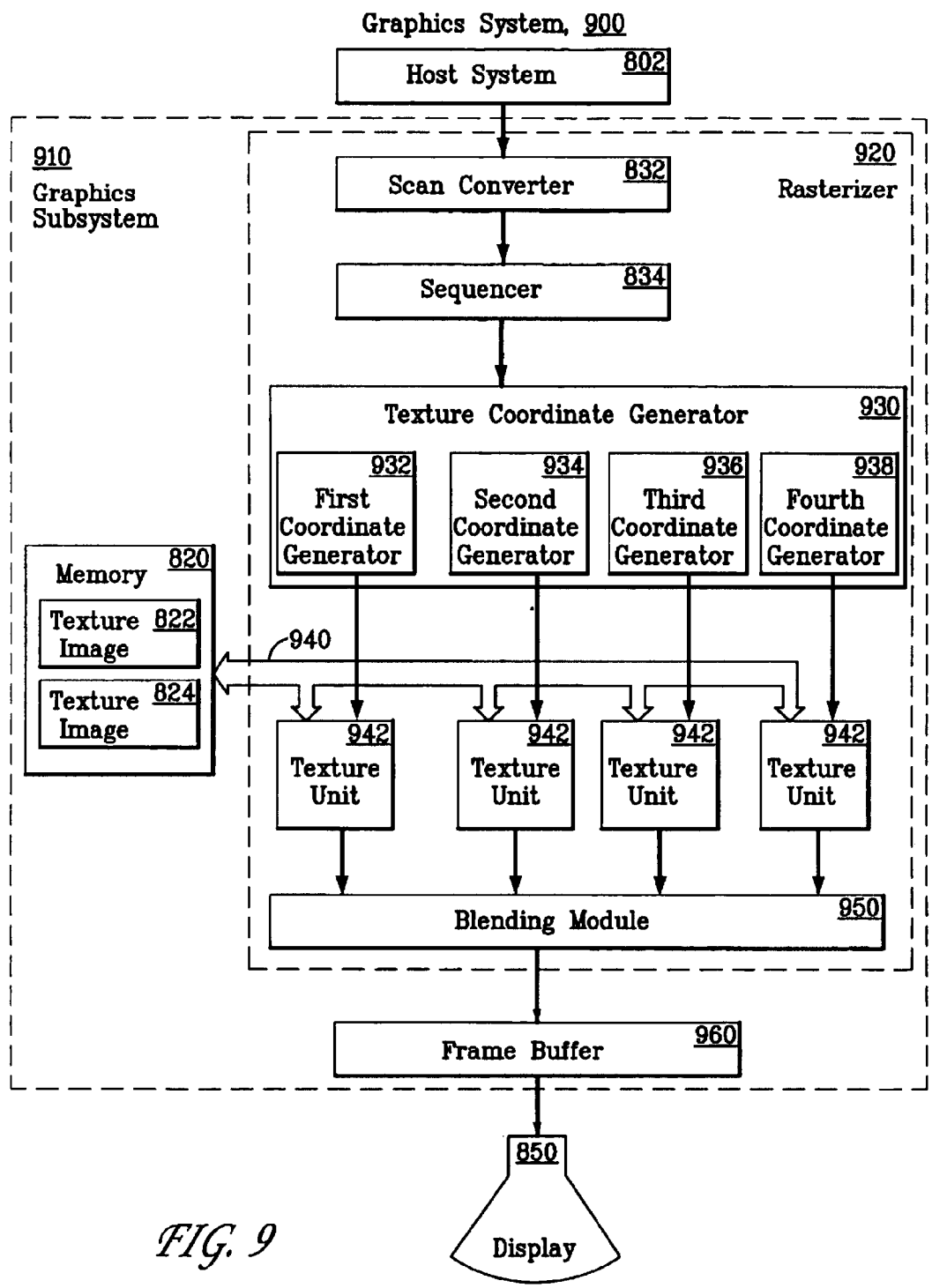
FIG. 9 illustrates an example graphics pipeline having four texture units according to an embodiment of the present invention.

In the description that follows, unless otherwise stated, it is assumed that pixel 504 in FIG. 5 is being rendered using a computer having limited graphics capabilities. More particularly, it is assumed, unless otherwise stated, that the computer's graphics hardware does not include a graphics chip having a built-in anisotropic filtering instruction. FIG. 8 illustrates an example graphics system 800 according to an embodiment of the present invention, which has a graphics pipeline having a single texture unit. FIG. 9 illustrates an example graphics system 900 according to an embodiment of the present invention, which has a graphics pipeline having four texture units capable of operating in parallel. As described herein, graphics system 800 can be used to implement method 200, which is illustrated in FIG. 2A. Graphics system 900 can be used to implement method 250, which is illustrated in FIG. 2B.

1. Example System Embodiments of the Present Invention

Before describing the steps of methods 200 and 250, it is usefully to described system embodiments of the present invention that can be used to implement methods 200 and 250. Thus, example graphics systems 800 and 900 according to the present invention are described below. Addition details regarding the features of graphics systems 800 and 900 are given in the description of the method embodiments described herein.

FIG. 8 illustrates an example graphics system 800 according to an embodiment of the present invention. Graphics system 800 comprises a host system 802, a graphics subsystem 810, and a display 850. Each of these features of graphics system 800 is further described below.

Host system 802 comprises an application program 804, a processor 806, and a hardware interface 808. Application program 804 can be any program requiring the rendering of a computer image or scene. The computer code of application program 804 is executed by processor 806. Application 804 assesses the features of graphics subsystem 810 and display 850 through hardware interface 808.

Graphics subsystem 810 comprises memory 820, rasterizer 830, and frame buffer 840. Memory 820 can store one or more texture images. For example, memory 820 is shown storing two texture images 822 and 824. Memory 820 is connected to texture unit 838 by a bus 826. Rasterizer 830 comprises a scan converter 832, a sequencer 834, a texture coordinate generator 836, and a texture unit 838 having a blending module 839. Scan converter 832 scan-converts rendering data received from host system 802 and application program 804 to fragments. Sequencer 834 passes each fragment to texture coordinate generator 836. Texture coordinate generator 836 generates texture coordinates based on the information provided in the fragments. Texture unit 838 uses the generated texture coordinates to fetch a texel from texture image 822 or 824. In some embodiments of the present invention, texture unit 838 can obtain either a bilinearly filtered or a trilinearly filtered texel from texture image 822 or 824. The present invention will also work for texture units yet to be developed that may be capable of obtaining an anisotropicly filtered texel from texture image 822 or 824. As described herein, the present invention can be used to increase the filtering performance of any graphics hardware. Blending module 839 blends texels and/or pixel values to produce a single texel or pixel. The output of texture unit 838 is stored in frame buffer 840. Display 850 can be used to display images or scenes stored in frame buffer 840.

FIG. 9 illustrates an example graphics system 900 according to an embodiment of the present invention, which has a graphics pipeline having four texture units capable of operating in parallel. Graphics system 900 comprises a host system 802, a graphics subsystem 910, and a display 850. Host system 802 and display 850 are similar to host system 802 and display 850 described above. Thus, the features of host system 802 and display 850 are not repeated here. The features of graphics subsystem 910 are described below.

Graphics subsystem 910 comprises a memory 820, a rasterizer 920, and a frame buffer 960. Memory 820 is similar to memory 820 described above. Rasterizer 920 comprises scan converter 832, sequencer 834, texture coordinate generator 930, four texture units 942, and a blending module 950. Scan converter 832 scan-converts rendering data received from host system 802 to fragments. Sequencer 834 passes each fragment to texture coordinate generator 930. Texture coordinate generator 930 generates four sets of texture coordinates based on the in formation provided in the fragments. Texture units 942 use the generated texture coordinates to fetch up to four texels from texture image 822 or 824. In some embodiments of the present invention, texture units 942 can obtain either a bilinearly filtered or trilinearly filtered texel from texture image 822 or 824. The present invention will also work for texture units yet to be developed that may be capable of obtaining an anisotropicly filtered texel from texture image 822 or 824. As described herein, the present invention can be used to increase the filtering performance of any graphics hardware. Texture units 942 are connected to memory 820 by a bus 940. Blending module 950 blends up to four texels and/or pixel values received from texture units 942 to produce a single texel or pixel. The output of blending module 950 is stored in frame buffer 960. Display 850 can be used to display images or scenes stored in frame buffer 960.

As would be known to a person given the description herein, graphics system 900 can have more or less than four texture units. Thus, it should be understood that having four texture units is not a limitation of the present invention. In addition, it should be understood that the multipass feature of graphics system 800 can be combined with the parallel texture unit feature of graphics system 900 to produce a graphics system wherein multiple, parallel passes through a graphics pipeline having two or more texture units are possible. Such a system is considered to be within the scope of the present invention, and the description herein teaches one skilled in the relevant art how to make and use such a system.

2. Example Method Embodiments of the Present Invention

Figure 3:
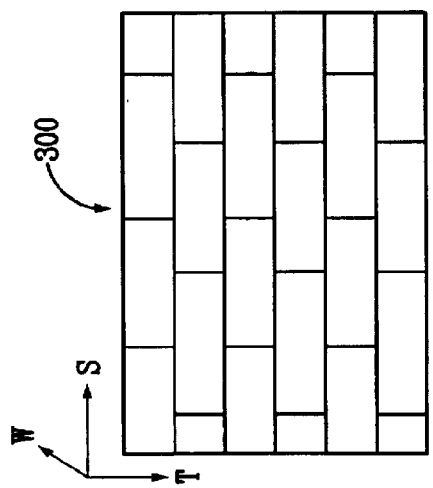
FIG. 3 illustrates an example texture image according to an embodiment of the present invention.

The various method embodiments of the present invention are described with reference to texture image 300, object 400, image 500, and MIP-Map 600. FIG. 3 illustrates an example texture image 300 according to an embodiment of the present invention. Texture image 300 is intended to represent a series of stacked blocks such as, for example, stacked cinder blocks or bricks. As would be known to a person skilled in the relevant art, texture image 300 is not intended to limit the present invention as any texture image can be used in accordance with the various embodiments of the present invention.

Figure 4:
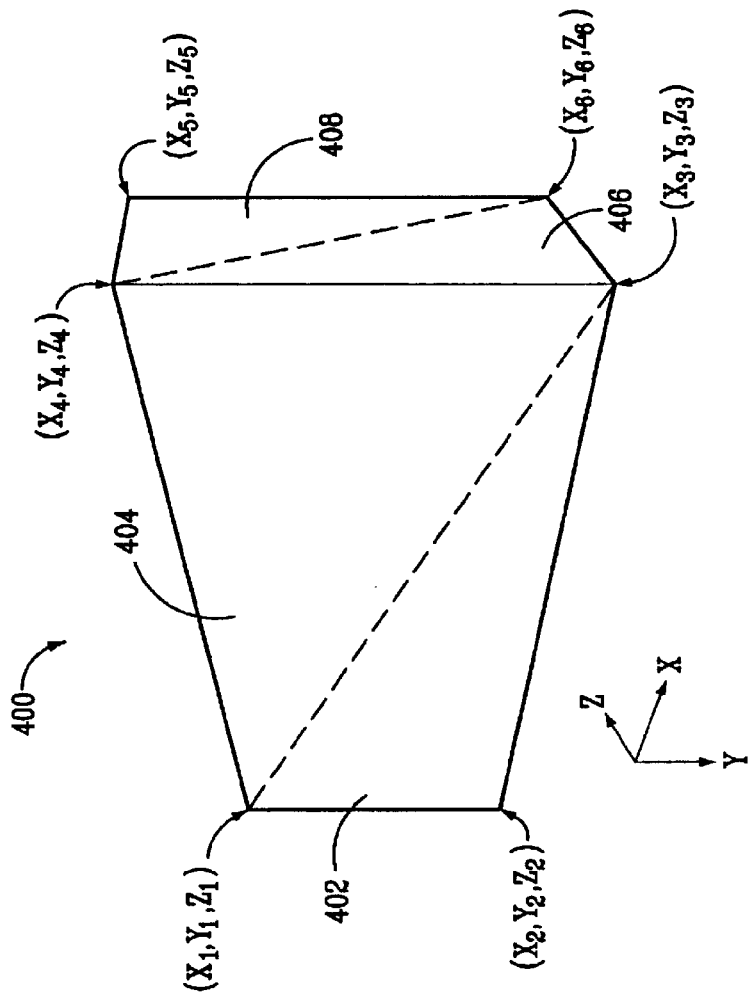
FIG. 4 illustrates an example computer-generated object according to an embodiment of the present invention.

FIG. 4 illustrates an example computer generated object 400 or geometric model according to an embodiment of the present invention. As can be seen in FIG.4, object 400 comprises four triangles 402, 404, 406, and 408. Triangle 402 has three vertices at the general coordinates $(X_1, Y_1, Z_1)$, $(X_2, Y_2, Z_2)$, and $(X_3, Y_3, Z_3)$. Triangle 404 has three vertices at the general coordinates $(X_1, Y_1, Z_1)$, $(X_4, Y_4, Z_4)$, and $(X_3, Y_3, Z_3)$. Triangle 406 has three vertices at the general coordinates $(X_4, Y_4, Z_4)$, $(X_3, Y_3, Z_3)$, and $(X_6, Y_6, Z_6)$. Triangle 408 three vertices at the general coordinates $(X_4, Y_4, Z_4)$, $(X_5, Y_5, Z_5)$, and $(X_6, Y_6, Z_6)$. Object 400 is intended to represent a wall. As would be known to a person skilled in the relevant art, object 400 is not intended to limit the present invention as any two-dimensional or three-dimensional object can be used in accordance with the various embodiments of the present invention.

FIG. 5 illustrates an example computer scene or image formed by applying texture image 300 to the surfaces of object 400. It should be noted here that the surfaces of object 400 are trapezoidal and not rectangular. Thus, as would be known to a person skilled in the relevant art, texture image 300 must be non-linearly mapped to the surfaces of object 400 in order to produce the image shown in FIG. 5. Two pixel 502 and 504 are shown in FIG. 5. Pixels 502 and 504 are intended to be representative of the plurality of pixels that make up image 500.

Figure 6:
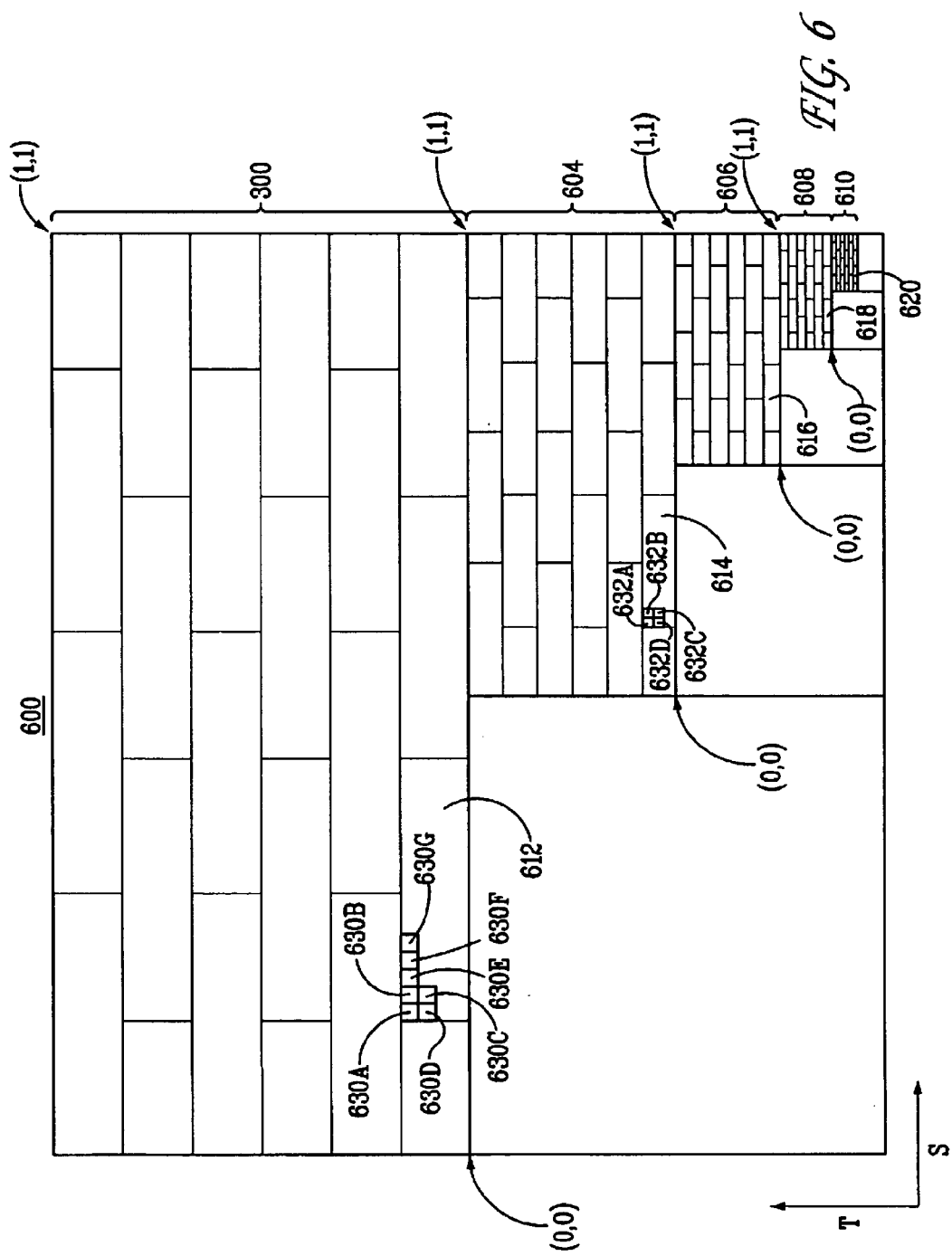
FIG. 6 illustrates an example MIP-Map texture image according to an embodiment of the present invention.

In an embodiment of the present invention, texture image 300 is used to generate a special type of texture image known in the relevant art as a MIP-Map. FIG. 6 illustrates an example MIP-Map 600 according to an embodiment of the present invention that can be generated from texture image 300. As would be known to a person skilled in the relevant art, MIP-Map 600 can be received in step 202 of method 200 or step 252 of method 250 and stored in a special memory know as a texture memory.

MIP-Map 600 can be thought of as comprising five separate texture images 300, 604, 606, 608, and 610 that are stored together in a single two-dimensional array. Texture image 300 in FIG. 6 is identical to texture image 300 in FIG. 3. Texture image 604 is a 4:1 resized texture image obtained from texture image 300. Texture image 604 can be created by blending four neighboring texels of texture image 300 to produce a single texel of texture image 604. For example, texel 632A in block 614 of texture image 604 can be generated by averaging the four texels 630A, 630B, 630C, and 630D in block 612 of texture image 300. Texture image 606 is a 4:1 resized texture image of texture image 604. As described above, the four texels 632A, 632B, 632C, and 632D of block 614 can be blended together to form a texel of block 616 in texture image 606. Texture image 606 is thus a 16:1 resized texture image of texture image 300. Texture image 608 is a 4:1 resized texture image of texture image 606 and a 64:1 resized texture image of texture image 300. In a manner similar to that described above, the texels of block 616 can be blended to form the texels of block 618. Texture image 610 is a 4:1 resized texture image of texture image 608 and a 256:1 resized texture image of texture image 300. The texels of block 618 can be blended to form the texels of block 620, as would be known to a person skilled in the relevant art given the description herein. How to construct MIP-Map 600 would be known to a person skilled in the relevant art given the description herein.

Each of the texture images 300, 604, 606, 608, and 610 that comprise MIP-Map 600 can be thought of as comprising different levels of detail about the original texels of texture image 300 shown in FIG. 3. For example, texture image 300 in FIG. 6 has the greatest level of texel detail. Texture image 604 has the next highest level of texel detail, followed by the detail in texture image 606, 608, and 610, respectively. Additional texture images could be formed that would have even less detail the texture image 610 until a texture image having only one texel was formed.

As would be known to a person skilled in the relevant art, texture image 300 of MIP-Map 600 is typically referred to as level of detail zero (LOD-0). Texture image 604 is typically referred to as LOD-1, and texture images 606, 608, and 610 are typically referred to as LOD-2, LOD-3, and LOD-4, respectfully. Thus, in embodiments of the present invention, the rendering data received in step 202 of method 200 or step 252 of method 250 can include a reference to one of the LOD's of MIP-Map 600. As can be seen in FIG. 6, any texel of MIP-Map 600 can be referenced by giving its S and T coordinates, and therefore the rendering data received in step 202 of method 200 or step 252 of method 250 can also include a reference S and T coordinates of MIP-Map 600. The ranges of S and T, as illustrated in FIG. 6, are from zero to one. The same location on each LOD is represented by the equivalent set of coordinates in any other LOD. The LOD is selected based on the scale of texels with respect to pixels as would be known to a person skilled in the relevant art given the description herein.

A. Anisotropic Filtering According to the Present Invention

As would be known to a person skilled in the relevant art, anisotropy is the visible image distortion seen in the pixels of three-dimensional objects when they are rendered with one or more of their surfaces oriented at an angle with respect to the plane of the display screen. This distortion can be reduced or corrected with anisotropic filtering techniques implemented according to the present invention. For a description of the theory of anisotropic filtering, see Gabriel et al. An advantage of the present invention over the method and system described by Gabriel et al. is that the present invention permits anisotropic filtering to be implemented on any graphics systems, and not just graphics systems equipped with the filtering system described by Gabriel et al. Furthermore, using the methods of the present invention, it is possible to improve the filtering process of graphics systems equipped with the filtering system described by Gabriel et al.

1. Example Multipass, Single Texture Unit Embodiment for Performing Anisotropic Filtering According to the Present Invention FIG. 2A illustrates a Method 200 for filtering a texture applied to a surface of an object. Method 200 comprises steps 202, 204, 206, 208, and 210. Method 200 can be implemented using graphics system 800. As described herein, anisotropic filtering can be achieved by performing as few as two passes through the graphics pipeline of graphics system 800.

The description of method 200 that follows first gives a general overview of method 200. This general overview of method 200 is then followed by a more detailed description of method 200.

Method 200 starts at step 202. In step 202, rendering data for an object, or a graphics primitive, is received from an application program and a pixel is selected for rendering.

In step 204, a set of texture coordinates is generated for the pixel being rendered based on the rendering data received in step 202. The set of texture coordinates can be, for example, generated in a graphics subsystem by performing a concatenation operation or by reading a set of texture coordinates determined by a host system under the control of an application program, and passed to the graphics subsystem using a graphics API.

In step 206, a texture sample is obtained from a texture image using the set of texture coordinates generated in step 204. The texture sample obtained from the texture image can be, for example, a bilinearly filtered texture sample or a trilinearly filtered texture sample.

In step 208, which is only perform during a second or subsequent pass through a graphics pipeline, e.g., the graphics pipeline of graphics system 800, the texture sample obtained in step 206 is blended with a previously obtained texture sample that has been stored in a frame buffer. The blending of the texture samples in step 208 generates a new texture sample having a greater degree of filtering.

In step 210, the resulting texture sample of step 206 or 208 is stored in a frame buffer.

The detailed description of method 200 that follows describes to one skilled in the relevant art how to render pixel 504 according to an embodiment of the present invention. As would be known to a person skilled in the relevant art given the description herein, in order to perform anisotropic filtering during the rendering of pixel 504, it is first necessary to know how texture image 300 must be resized in order to be applied to the surface of object 400. That is to say, it is first necessary to know how S changes in relation to X and Y and how T changes in relation to X and Y at pixel 504. These relationships are given by dsdx, dsdy, dtdx, and dtdy at pixel 504, which can be determined using host system 802 of graphics system 800 and methods that would be known to a person skilled in the relevant art. Looking at pixel 504 of image 500, in FIG. 5, and texture image 300, in FIG. 6, which forms a part of MIP-Map 600, one can see that the S-axis of texture image 300 is resized to approximately one-fifth its original size while the T-axis is not resized at pixel 504.

As would be known to a person skilled in the relevant art given the description herein, texels 630A, 630E and 630G can be blended together to produce an anisotropicly filtered pixel 504. Therefore, in an embodiment of the present invention, application program 804 determines three sets of texture coordinates, which correspond to the texture coordinates of texels 630A, 630E, and 630G. These three sets of texture coordinates are then used by texture unit 838 to obtain three texture samples that are blended together to form pixel 504. In an embodiment, the three sets of texture coordinates are calculated by host system 802, under the control of application program 804, and passed to texture coordinate generator 836 of graphics system 800. Texture coordinate generator 836 performs any conversion of the received data that is needed in order for the data to be compatible with texture unit 838.

A general method for generating sets of texture coordinates is described at the end of this section. As would be apparent to a person skilled in the relevant art given the description herein, the method for generating sets of texture coordinates described below applies to graphics system 900 as well as graphics system 800.

To render pixel 504, in step 202 of method 200, rendering data for pixel 504 is passed to sequencer 834 under the control of application program 804. In an embodiment, the rendering data received at sequencer 834 comprises a set of screen coordinates for pixel 504 and three sets of texture coordinates for pixel 504. The three sets of texture coordinates correspond to the coordinates for texels 630A, 630E, and 630G of texture image 300 in FIG. 6.

During a first pass through the graphics pipeline of graphics system 800, in step 204 of method 200, a first set of texture coordinates corresponding to the texture coordinates for texel 630E is generated by texture coordinate generator 836 based on the rendering data received in step 202. In an embodiment, the first set of texture coordinates generated by texture coordinate generator 836 can be generated by reading the texture coordinates passed to a sequencer 834. In other embodiments, a first set of texture coordinates can be generated (e.g., by concatenation) based on different rendering data received in step 202. For example, an application program can send a base set of texture coordinates and an offset from the base set of texture coordinates to be used to generate a first set of texture coordinates. Other means for generating a first set of texture coordinates in step 204, based on the type of rendering data received in step 202, would be known to a person skilled in the relevant art given the description herein.

Next, in step 206 during a first pass through the graphics pipeline of graphics system 800, texture unit 838 is used to obtain a filtered texture sample from texture image 300. In an embodiment, a copy of MIP-Map 600 is stored in memory 820 as texture image 824. The type of texture sample obtained in step 206 depends on the capabilities of texture unit 838. For example, if texture unit 838 is only capable of obtaining point samples, the texture sample obtained in step 206 will be texel 630E. If texture unit 838 is capable of obtaining bilinearly or trilinearly filtered texture samples, the texture sample obtained in step 206 will be a bilinearly or trilinearly filtered texture sample centered about the texture coordinates for texel 630E. How a bilinearly or trilinearly filtered texture sample is obtained from a set of texture coordinates would be known to a person skilled in the relevant art given the description herein.

Finally, in step 210 during a first pass through the graphics pipeline of graphics system 800, the texture sample obtained in step 206 is stored in frame buffer 840. This step ends the first pass through the graphics pipeline of graphics system 800.

In a second pass through the graphics pipeline of graphics system 800, in step 202, the rendering data received from application program 804 that is needed to obtain a second texture sample from texture image 824 is passed from sequencer 834 to texture coordinate generator 834.

As described above, in an embodiment, the second set of texture coordinates generated by texture coordinate generator 836 in step 204 can be generated by reading the texture coordinates passed by sequencer 834. Thus, during a second pass through the graphics pipeline of graphics system 800, in step 204 of method 200, a second set of texture coordinates corresponding to the texture coordinates for texel 630A is generated by texture coordinate generator 836 based on the rendering data received in step 202.

Next, in step 206 during a second pass through the graphics pipeline of graphics system 800, texture unit 838 is used to obtain a filtered texture sample from texture image 300 based on the texture coordinates for texel 630A. As described above, the type of texture sample obtained in step 206 depends on the capabilities of texture unit 838. Either a point texture sample, a bilinearly filtered texture sample or a trilinearly filtered texture sample will be obtained in step 206.

In step 208 during a second pass through the graphics pipeline of graphics system 800, the texture sample obtained in step 206 during the first pass through the graphics pipeline, which is stored in frame buffer 840, is blended with the texture sample obtained in step 206 during the second pass through the graphics pipeline. This blending operation is performed by blending module 839. This blending operation produces a new texture sample having a grater degree of filtering, as would be known to a person skilled in the relevant art given the description herein.

In step 210 during a second pass through the graphics pipeline of graphics system 800, the texture sample produced in step 208 is stored in frame buffer 840. This step ends the second pass through the graphics pipeline of graphics system 800.

In a third pass through the graphics pipeline of graphics system 800, in step 202, the rendering data received from application program 804 that is needed to obtain a third texture sample from texture image 824 is passed from sequencer 834 to texture coordinate generator 834.

As described above, in an embodiment, the third set of texture coordinates generated by texture coordinate generator 836 in step 204 can be generated by reading the texture coordinates passed by sequencer 834. Thus, during a third pass through the graphics pipeline of graphics system 800, in step 204 of method 200, a third set of texture coordinates corresponding to the texture coordinates for texel 630G can be generated by texture coordinate generator 836 based on the rendering data received in step 202.

In step 206 during a third pass through the graphics pipeline of graphics system 800, texture unit 838 is used to obtain a third filtered texture sample from texture image 300 based on the texture coordinates for texel 630G. The type of texture sample obtained in step 206 depends on the capabilities of texture unit 838. Either a point texture sample, a bilinearly filtered texture sample or a trilinearly filtered texture sample will be obtained in step 206.

In step 208 during a third pass through the graphics pipeline of graphics system 800, the texture sample obtained in step 206 during the third pass through the graphics pipeline is blended with the filtered texture sample stored in frame buffer 840 in step 210 during the second pass through the graphics pipeline. This second blending operation is performed by blending module 839. This second blending operation produces a new texture sample having a grater degree of filtering, as would be known to a person skilled in the relevant art given the description herein.

Lastly, in step 210 during a third pass through the graphics pipeline of graphics system 800, the texture sample produced in step 208 is stored in frame buffer 840. This step ends the third pass through the graphics pipeline of graphics system 800 and method 200.

Ideally, as would be known to a person skilled in the relevant art given the description herein, in order to render pixel 504 with a very high degree of anisotropic filtering, texels 630A, 630B, 630E, 630F, and 630G can be blended together to form a single texture sample or pixel 504. Texture image 300 should be sampled to produce pixel 504 because the T-axis of texture image 300 is not resized at pixel 504 while the S-axis of texture image 300 is resized to approximately one-fifth its original size. As would be known to a person skilled in the relevant art given the description herein, blending five texels in the S-axis (each texel having the same T-axis coordinate) to form a filtered texture sample, i.e., pixel 504, achieves a 5:1 resizing in the S-axis and a 1:1 resizing in the T-axis of texture image 300 at pixel 504. The blending of texels 630A, 630B, 630E, 630F, and 630G can be accomplished according to the present invention with five passes through the graphics pipeline of graphics system 800. As described above, however, it is not necessary to blend five texels or texture samples to perform anisotropic filtering. Anisotropy can be reduced by performing as few as two passes through the graphics pipeline of graphics system 800, as described below, as would be apparent to a person skilled in the relevant art given the description herein.

Looking at pixel 502 of image 500, in FIG. 5, and texture image 300, in FIG. 6, which forms a part of MIP-Map 600, one can see that both the S-axis and the T-axis of texture image 300 are resized to approximately one-half of their original lengths at pixel 502. As would be known to a person skilled in the relevant art given the description herein, in order to render pixel 502 with a very high degree of anisotropic filtering, texels 630A, 630B, 630C, and 630D of MIP-Map 600 can be blended together to form pixel 502. This is due to the fact that both the S-axis and the T-axis of texture image 300 are resized to approximately one-half of their original lengths at pixel 502. Thus, blending two texels in the S-axis and two texels in the T-axis to form one pixel achieves a 2:1 resizing in both the S-axis and the T-axis of texture image 300 at pixel 502. It should be noted here, however, that MIP-Map 600 already contains a pre-filtered or resized copy of texture image 300 (i.e., texture image 604, which is a 4:1 resized texture image) that can be sampled during the rendering of pixel 502 in order to reduce the amount of time needed to render pixel 502. Instead of rendering pixel 502 as described above, it is possible to simply read, for example, texel 632A from MIP-Map 600. This is not the situation for every pixel of image 500, however, as would be known to a person skilled in the relevant art.

As would be apparent to a person skilled in the relevant art given the description herein, the texture sampling technique described above for generating sets of texture coordinates can be generalized, and used to form a basis for many different embodiments of the present invention. That is to say that the present invention encompasses many different texture sampling techniques. Which sampling technique of the present invention is used during the rendering of an image or computer scene can be controlled by an application program.

To illustrate the above point, in an embodiment of the present invention, data can be received in step 202 of method 200 regarding the number of passes that should be made through the graphics pipeline of graphics system 800 and which LOD of MIP-Map 600 is to be sampled. This information can then be used to determine how many texture samples are retrieved from a texture image and which texture sample is retrieved by texture unit 838 during each pass through the graphics pipeline of graphics system 800. The number of texture samples blended together to form a filtered pixel is equal to the number of passes through the graphics pipeline of graphics system 800. Furthermore, which particular texture sample is retrieved during each pass through the graphics pipeline can be determined by the pseudo-code in Table 1 and the lookup values in Table 2. As would be known to a person skilled in the relevant art given the description herein, pseudo-code and lookup values similar to that described herein can be generated for any available graphics hardware, and such pseudo-code and lookup values are considered to be within the scope of the present invention.

The methods for determining texture coordinates described in this section also apply to the various embodiments of the present invention described elsewhere herein, for example, in the sections below that describe how to use the present invention to perform bilinear and trilinear filtering on graphics systems having limited graphics capabilities. Given the description herein, it would be apparent to a person skilled in the relevant art how these methods for determining texture coordinates are used with the various embodiments of the invention described herein.

TABLE 1

```
/* determine the resizing of the texture image in the X
    direction (dtexdx) and Y direction (dtexdy) */
dtexdx = |dsdx| + |dtdx| − ½ min(|dsdx|, |dtdx|)
dtexdy = |dsdy| + |dtdy| − ½ min(|dsdy|, |dtdy|)
/* determine a unit change in the S coordinate (ds) and the
    T coordinate (dt) */
if dtexdx > dtexdy
        ds = dsdx
        dt = dtdx
else
        ds = dsdy
        dt = dtdy
/* determine maximum anisotropy and LOD */
if dtexdx > dtexdy
        dtexmax = dtexdx
        dtexmin = dtexdy
else
        dtexmax = dtexdy
        dtexmin = dtexdx
if dtexmax < 1.0
        dtexmax = 1.0
if dtexmin < 1.0
        dtexmin = 1.0
aniso = min((dtexmax/dtexmin), max_aniso_limit)
/* determine texture image sample coordinates */
S_Pass = S_0 + F(Pass) * ds;
T_Pass = T_0 + F(Pass) * dt
```

TABLE 2

| | F (Pass) | | | | | | | |
|---|---|---|---|---|---|---|---|---|
| Texel | Pass 1 | Pass 2 | Pass 3 | Pass 4 | Pass 5 | Pass 6 | Pass 7 | Pass 8 |
| 1 | 0 | | | | | | | |
| 2 | +¼ | −¼ | | | | | | |
| 3 | +⅓ | 0 | | | | | | |
| 4 | +⅜ | +⅛ | −⅛ | −⅜ | | | | |
| 5 | +⅖ | +⅕ | 0 | −⅕ | −⅖ | | | |
| 6 | +5/12 | +3/12 | +1/12 | −1/12 | −3/12 | −5/12 | | |
| 7 | +3/7 | +2/7 | +1/7 | 0 | −1/7 | −2/7 | −3/7 | |
| 8 | +7/16 | +5/16 | +3/16 | +1/16 | −1/16 | −3/16 | −5/16 | −7/16 |

2. Example Multipass, Multiple Texture Unit Embodiment for Performing Anisotropic Filtering According to the Present Invention To perform anisotropic filtering according to the present invention using a graphics pipeline having multiple texture units, for example, as illustrated by graphics system 900, a minor modification is made to the embodiment described above. This modification is illustrated in FIG. 2B.

FIG. 2B illustrates a method 250 according to an embodiment of the present invention, wherein multiple texture units are able to operate in parallel. Method 250 comprises steps 252, 254A, 254B, 256A, 256B, 258, 260, and 262. Method 250 can be implemented using graphics system 900. As described herein, anisotropic filtering can be achieved by performing just one pass through the graphics pipeline of graphics system 900. The description of method 250 that follows first gives a general overview of method 250. This general overview is then followed by a detailed description of method 250.

Method 250 starts at step 252. In step 252, rendering data for an object, or a graphics primitive, is received from an application program and a pixel is selected for rendering.

In step 254A, a first set of texture coordinates is generated for the pixel being rendered based on the rendering data received in step 252. The first set of texture coordinates can be, for example, generated in a graphics subsystem by performing a concatenation operation or by reading a first set of texture coordinates determined by a host system under the control of an application program, and passed to the graphics subsystem using a graphics API.

In step 254B, a second set of texture coordinates is generated based on the rendering data received in step 252, in a manner similar to that of step 254A.

In step 256A, a first texture sample is obtained from a texture image using the first set of texture coordinates generated in step 254A. The texture sample obtained from the texture image can be, for example, a point sample, a bilinearly filtered texture sample, or a trilinearly filtered texture sample.

In step 256B, a second texture sample is obtained from a texture image using the second set of texture coordinates generated in step 254B. The texture sample obtained from the texture image is also, for example, a point sample, a bilinearly filtered texture sample? or a trilinearly filtered texture sample.

In step 258, the first and second texture samples obtained in steps 256A and 256B, respectively, are blended together. The blending of the first and second texture samples in step 258 generates a new texture sample having a greater degree of filtering.

In step 260, which is only perform during a second or subsequent pass through a graphics pipeline, the texture sample obtained in step 258 during a second or subsequent pass through the graphics pipeline is blended with a previously obtained texture sample that has been stored in a frame buffer. The blending of the texture samples in step 260 generates a new texture sample having a greater degree of filtering.

In step 262 of method 250, the resulting texture sample of step 258 or step 260 is stored in a frame buffer. The steps of method 250 can be repeated several times in order to render pixels having a high degree of filtering.

The detailed description of method 250 that follows describes to one skilled in the relevant art how to render pixel 504 according to an embodiment of the present invention. As illustrated in FIG. 9, the graphic pipeline of graphics system 900 has four texture units 942. It is possible therefore to obtain four texture samples in a single pass through the graphics pipeline of graphics system 900. It is also possible, therefore, as would be apparent to a person skilled in the relevant art given the description herein, to render and anisotropicly filter pixel 504 of image 500 in FIG. 5 in a single pass through the graphics pipeline.

In order to render and anisotropicly filter pixel 504, in step 252 of method 250, rendering data for pixel 504 is passed to sequencer 834 under the control of an application program running on host system 802. In an embodiment, the rendering data received at sequencer 834 comprises a set of screen coordinates for pixel 504 and a single set of texture coordinates for pixel 504. The single set of texture coordinates received in step 252 is assumed to correspond to the coordinates for texel 630E of texture image 300 in FIG. 6.

In steps 254A and 254B of method 250, a first and second set of texture coordinates are generated for the pixel to be rendered based on the rendering data received in step 252. Steps 254A and 254B can be performed in parallel. Using graphics subsystem 910 of graphics system 900, it is possible to generate up to four sets of texture coordinates in parallel in a single pass through the graphics pipeline of graphics subsystem 910. Graphics subsystem 910 is illustrated in FIG. 9 as having four texture units 942 in parallel to make it clear that method 250 applies to graphics systems having two or more texture units 942 capable of operating in parallel.

As would be apparent to a person skilled in the relevant art given the description herein, a technique for deciding how to determine the four sets of texture coordinates that are generated in texture coordinate generator 930 is required. In an embodiment of the present invention, the four texture coordinates are determined using the pseudo-code listed in Table 3, based upon values for dsdx, dsdy, dtdx, and dtdy, which can be determined using methods that would be known to a person skilled in the relevant given the description herein. These four sets of texture coordinates are generated by first coordinate generator 932, second coordinate generator 934, third coordinate generator 936, and fourth coordinate generator 938, respectively. Other methods for generating sets of texture coordinates, similar to those described herein, can also be used however.

In steps 256A and 256B, a first and second texture sample is obtained from a texture image, e.g., texture image 824. Steps 256A and 256B can be performed in parallel. The type of texture sample obtained in steps 256A and 256B depends on the capabilities of texture units 942. Either a point sample, a bilinearly filtered texture sample, or a trilinearly filtered texture sample will be obtained. As illustrated in FIG. 9, it is possible to obtain four texture samples in parallel using graphics subsystem 910.

In step 258, the first and second texture samples obtained in steps 256A and 256B, respectively, are blended together to produce a new texture sample having a greater degree of filtering. As illustrated in FIG. 9, up to four texture samples, i.e., the outputs of texture units 942, can be blended using blending module 950.

TABLE 3

```
/* determine the resizing of the texture image in the X
   direction (dtexdx) and Y direction (dtexdy) */
dtexdx = |dsdx| + |dtdx| − ½ min (|dsdx|, |dtdx|)
dtexdy = |dsdy| + |dtdy| − ½ min (|dsdy|, |dtdy|)
/* determine a unit change in the S coordinate (ds) and the
   T coordinate (dt) */
if dtexdx > dtexdy
        ds = dsdx
        dt = dtdx
else
        ds = dsdy
        dt = dtdy
/* determine texture image sample coordinates */
$S_0 = S_0 + ⅛ * ds; T_0 = T_0 + ⅛ * dt$
$S_1 = S_1 − ⅛ * ds; T_1 = T_1 − ⅛ * dt$
$S_2 = S_2 + ⅜ * ds; T_2 = T_2 + ⅜ * dt$
$S_3 = S_3 − ⅜ * ds; T_3 = T_3 − ⅜ * dt$
```

In step 260, which is only perform during a second or subsequent pass through a graphics pipeline, the texture sample obtained in step 258 during a second or subsequent pass through the graphics pipeline is blended with a previously obtained texture sample that has been stored in a frame buffer. The blending of the texture samples in step 260 generates a new texture sample having a greater degree of filtering.

Although not specifically shown in FIG. 9, it should be understood that the multipass feature of graphics system 800 can be combined with the parallel texture unit feature of graphics system 900 to produce a graphics system wherein multiple passes through a graphics pipeline having two or more texture units are possible. For example, blending module 950 can blend the outputs of the texture units 942 to produce a new texture sample, which is then blended with a texture sample stored in frame buffer 960. Such a system is considered to be within the scope of the present invention, and the description herein teaches one skilled in the relevant art how to make and use such a system. The blending operation in blending module 950 can combine various texture samples using a different weighting factor for each texture sample, in a manner that would be known to a person skilled in the relevant art given the description herein.

It should be understood that various embodiments and features of the present invention have been described herein by way of example only and not limitation. The various embodiments of the present invention described herein are sufficient to teach a person skilled in the relevant art how to perform anisotropic filtering according to the present invention on any existing graphics system. As mentioned at the beginning of this section, it is an advantage of the present invention that it can be used to perform anisotropic filtering in any graphics systems. Furthermore, using the methods of the present invention, it is possible to further improve the filtering process of any graphics system, including graphics systems equipped with hardware capable of performing anisotropic filtering. Additional benefits and features of the present invention will be apparent to a person skilled in the relevant art given the description herein.

B. Bilinear Filtering According to the Present Invention

In addition to performing anisotropic filtering, embodiments on the present invention can also be used to perform bilinear filtering on a computer having limited graphics capabilities. For example, an embodiment of the present invention could be used to render a bilinearly filtered pixel 502 using a graphics system that is capable of only obtaining point samples. How this is accomplished is described in detail below with regard to method 200 and graphics system 800.

In this embodiment, in step 202 of method 200, rendering data is received for object 400 from application program 804 running on host system 802. As would be known to a person skilled in the relevant art, image 500 can be rendered using intensity or color data and geometric or polygon data. Intensity data is often stored and can be received in the form of a texture image. A texture image is an array of intensity data or texels. Geometric data is often stored and can be received in the form of a list of coordinates representing the vertices of a plurality of triangles.

Figure 7:
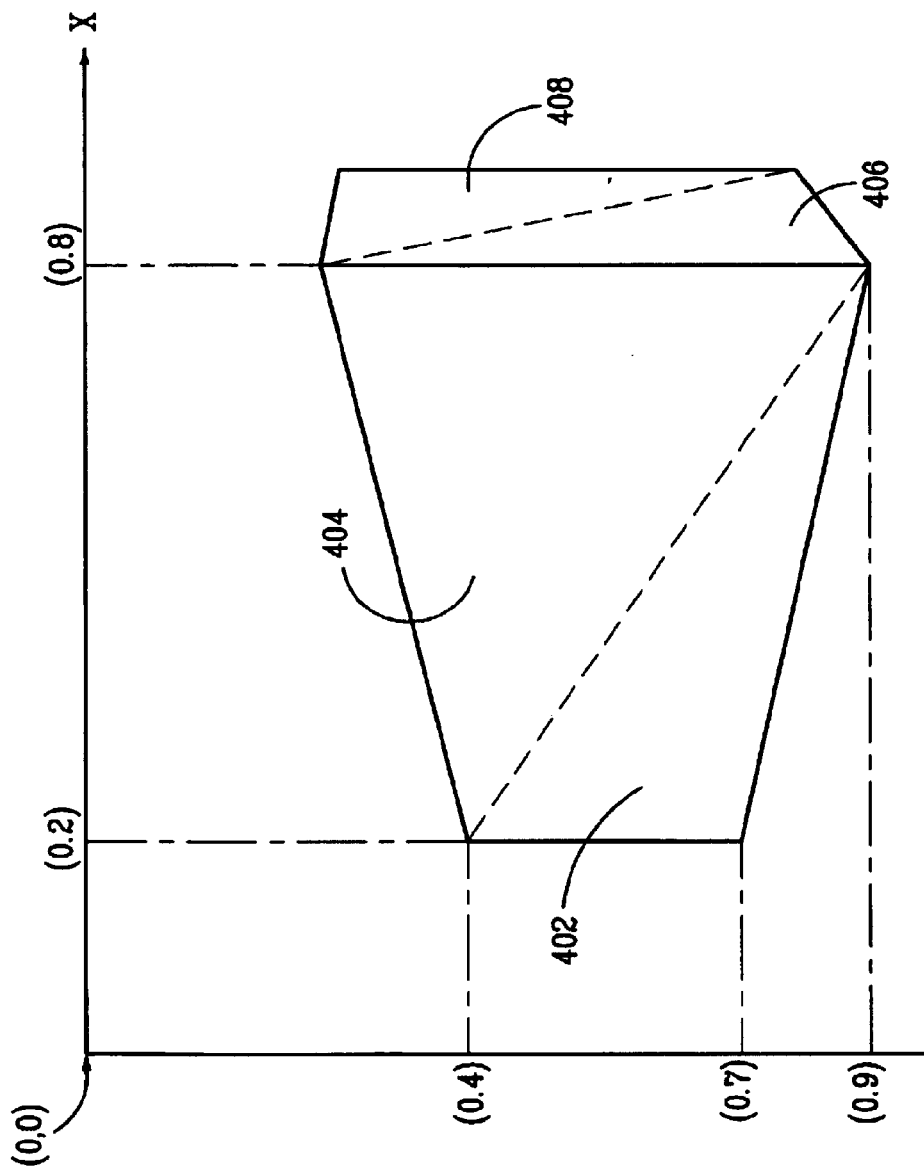
FIG. 7 illustrates example screen vertex coordinates for the computer-generated object of FIG. 4.

In an embodiment of the present invention, the rendering data received in step 202 includes texture image 300, or MIP-Map 600, and the coordinates of the six triangle vertices, as shown in FIG. 7. For example, the X and Y coordinates of the three vertices of triangle 402 in FIG. 7 are (0.2, 0.4), (0.2, 0.7), and (0.8, 0.9). In step 202, texture coordinate information is received indicating what portion of MIP-Map 600, shown in FIG. 6, should be applied to each surface of object 400. For example, S, T, and W coordinate data and/or level of detail (LOD) data can be received in step 202 of method 200 to indicate the portion of MIP-Map 600 that is to be applied to each surface of object 400.

As would be known to a person skilled in the relevant art given the description herein, the present invention is not limited to receiving rendering data in step 202 in one of the particular formats described above. Rendering data can be received in step 202 in any format and converted to an appropriate format for use with the various embodiments of the present invention described herein.

In some embodiments, control data is received in step 202 indicating the number of passes through the graphics pipeline that should be performed. The number of passes through the graphics pipeline that are to be performed can be received in many different forms such as, for example, a number. Alternatively, a token representing a specific type of filtering to be performed can be received in step 202, which can then be equated to a specific number of passes through the graphics pipeline. For example, if a request to perform bilinear filtering is received in step 202, in a system having graphics hardware with a single texture unit, such as for example graphics system 800, that is only capable of performing point sampling, four passes through the graphics pipeline would be required to produce a bilinearly filtered pixel. For the purposes of the present example embodiment being described herein, it is assumed that the data received in step 202 indicates that four passes through the graphics pipeline are to be performed.

Referring to FIG. 2 again, in step 204 of method 200 during a first pass through the graphics pipeline, a first set of texture coordinates for pixel 502 of image 500 is determined using texture coordinate generator 836. As described above, there are many ways to determine texture coordinates. The method used by texture coordinate generator 836 will depend on the capabilities of the graphics hardware and the amount of control the application program has over the graphics hardware. For ease of discussion, it is assumed that the data received from application program 804 in step 202 indicates that the first S and T texture coordinates for pixel 502 are (0.58, 0.72). These texture coordinates represent the location of texel 632A of MIP-Map 600.

In step 206 during a first pass through the graphics pipeline, a copy of texel 632A of MIP-Map 600 is retrieved based on the texture coordinates (0.58, 0.72) determined in step 204. In an embodiment of the present invention, a copy of MIP-Map 600 is stored in memory 820 as texture image 824. Memory 820 is typically a high speed graphics memory, and it is connected to texture unit 838 by bus 826. Texel 632A is retrieved or read from memory 820, in a manner that would be known to a person skilled in the relevant art.

In step 210 during a first pass through the graphics pipeline, texel 632A is stored or written to frame buffer 840.

In step 202 during a second pass through the graphics pipeline of graphics system 800, a second set of texture coordinates is received for the pixel being rendered. This second set of texture coordinates is offset from the first set of texture coordinates. This offset typically is chosen so that a neighboring texel of texel 632A is selected for retrieval. For example, the second set of texture coordinates may correspond to the location of texel 632B, 632C, or 632D. It is assumed that the second set of texel coordinates corresponds to texel 632B.

In step 204 during a second pass through the graphics pipeline, a second set of texture coordinates is generated in a manner similar to that described above.

In step 206 of method 200 during a second pass through the graphics pipeline, a copy of texel 632B is retrieved or read from memory 820.

In step 208, texel 632B is blended with texel 632A by blending module 839 according to the following blending equation:

$$T_{Filtered} = T_{First}(bf_1) + T_{second}(bf_2) \quad \text{EQ. 1}$$

where:
$T_{Filtered}$ is a resultant filtered texel;
$T_{First}$ is a first texel;
$T_{Second}$ is a second texel; and
$bf_1$ and $bf_2$ are predetermined blending factors.

In an embodiment, $bf_1$ and $bf_2$ are both equal to 0.5. In other embodiments, the blending factors $bf_1$ and $bf_2$ are set by application program 804.

In step 210 of method 200 during a second pass through the graphics pipeline, the filtered texel that results from step 208 is stored in frame buffer 840.

As would be known to a person skilled in the relevant art given the description herein, two additional passes through the graphics pipeline of graphics system 800 are required to produce a bilinearly filtered pixel 502. In a third pass through the graphics pipeline of graphics system 800, steps 202 and 204 are repeated to generate a third set of texture coordinates for pixel 502 using texture coordinate generator 836. This third set of texture coordinates is unique from the first and second sets of texture coordinates. For example, in a third pass through the graphics pipeline of graphics system 800, the texel coordinates generated in step 204 may correspond to texel 632C. In step 206 during a third pass through the graphics pipeline, a copy of texel 632C is retrieved by texture unit 838.

In step 208, during the third and subsequent passes through the graphics pipeline of graphics system 800, the texture sample stored in frame buffer 840 is blended with the last texture sample retrieved by texture unit 838 according to EQ. 1 above. Thus, after the third pass through the graphics pipeline of graphics system 800, the texture sample stored in frame buffer 840 is a texture sample that results from blending texels 632A, 632B, and 632C according to predetermined weighting factors.

After a fourth pass through the graphics pipeline of graphics system 800, according to the method described herein, the texture sample (or pixel 502) stored in frame buffer 840 will be a result of the blending of the four texels 632A–D. As would be known to a person skilled in the relevant art given the description herein, the pixel stored in frame buffer 840 is a bilinearly filtered pixel. Thus, as described herein, method 200 can be used to achieve bilinear filtering in a graphics system having only a point-sampling graphics capability.

As would be known to a person skilled in the relevant art given the description herein, the same result can be achieved using method 250 and a single pass through the graphics pipeline of graphics system 900. The operation of graphic system 900 is similar to that of graphics system 800 except that graphics system 900 has four texture units 942, similar to texture unit 836 of graphics system 800, that can be operated in parallel. As can be seen in FIG. 9, all four of the passes through the graphics pipeline described above can be performed in just a single pass through the graphics pipeline of graphics system 900.

As would be apparent to a person skilled in the relevant art given the description herein, if method 250 were implemented on a system similar to the systems of graphics system 800 and 900, e.g., a system having two texture units operating in parallel with a capability to perform multiple passes through the graphics pipeline, it would take two passes through the graphics pipeline to achieve bilinearly filtered pixels.

C. Trilinear Filtering According to the Present Invention

Trilinear filtering can be achieved using either method 200 or method 250, in a manner similar to that described above, and either graphics systems 800 or 900. Various embodiments of the present invention for performing trilinear filtering are described below.

To perform trilinear filtering using the example graphics system 800 described above (i.e., assuming that texture unit 838 can only perform point sampling), one would have to perform two bilinear filtering operations, using different LODs of MIP-Map 600, and then blend the resulting bilinearly filter texture samples or pixels using blending module 839 to achieve a trilinearly filtered pixel. For example, to obtain a trilinearly filtered pixel 502 (from LOD-0 and LOD-1 of MIP-Map 600) using method 200 and graphics system 800, one would first perform the same bilinear filtering operation described above for pixel 502 using texels 632A–D. Next, one would read the resultant bilinearly filtered texture sample from frame buffer 840 and store the bilinearly filtered texture sample in the memory of host system 802. One would then perform a second bilinear filtering operation, similar to that described above, for texels 630A–D. At the end of this second bilinear filtering operation, the bilinearly filtered texture sample, resulting from the blending of texels 630A–D, is stored in frame buffer 840. Now a trilinearly filtered pixel can be produced by copying the resulting texture sample from the first bilinear filtering operation to frame buffer 840 and blending the copied texture sample with the texture sample residing in frame buffer 840 in a manner that would be known to a person skilled in the relevant art given the description herein. The blending of the resultant texture samples of the two bilinear filtering operations can be performed using blending module 839 in accordance with EQ. 1.

If graphic system 800 is upgraded so that texture unit 838 is capable of performing bilinear filtering, it is much simpler to achieve trilinear filtering using method 200 and graphics system 800. In this embodiment, trilinear filtering can be achieved in two passes through the graphics pipeline of graphics system 800.

In the first pass through the graphics pipeline of graphics system 800, rendering data is received in step 202 in a manner similar to that described above. In step 204, a first set of texture coordinates is generated similar to that described above. In step 206, however, rather than retrieving only a point sample, texture unit 836 retrieves a bilinearly sampled texel from MIP-Map 600 (e.g., using texels 632A–D). Thus, at the end of the first pass through the graphics pipeline, a bilinearly filtered texture sample is stored in frame buffer 840.

In a second path through the graphics pipeline, in a manner similar to that described above, a second set of texture coordinates for a different LOD of MIP-Map 600 is generated. In step 206, a second bilinearly filtered texture sample is obtained from MIP-Map 600 using a different LOD than that used during the first pass through the graphics pipeline.

In step 208, the second bilinearly filtered texture sample obtained in step 206 is blended with the bilinearly filtered texture sample stored in frame buffer 840, according to EQ. 1, to produce a trilinearly filtered texture sample or pixel. How each of the steps of method 200 is performed in this embodiment would be known to a person skilled in the relevant art given the description herein.

If texture units 942 of graphics system 900 are upgraded so that they too can perform bilinear filtering, graphics system 900 can be used to produce trilinearly filtered pixels using just two of the four texture units 942 of graphic system 900 in a single pass through the graphics pipeline of graphics system 900. How this is achieved would be known to a person skilled in the relevant art given the description herein.

Figure 10:
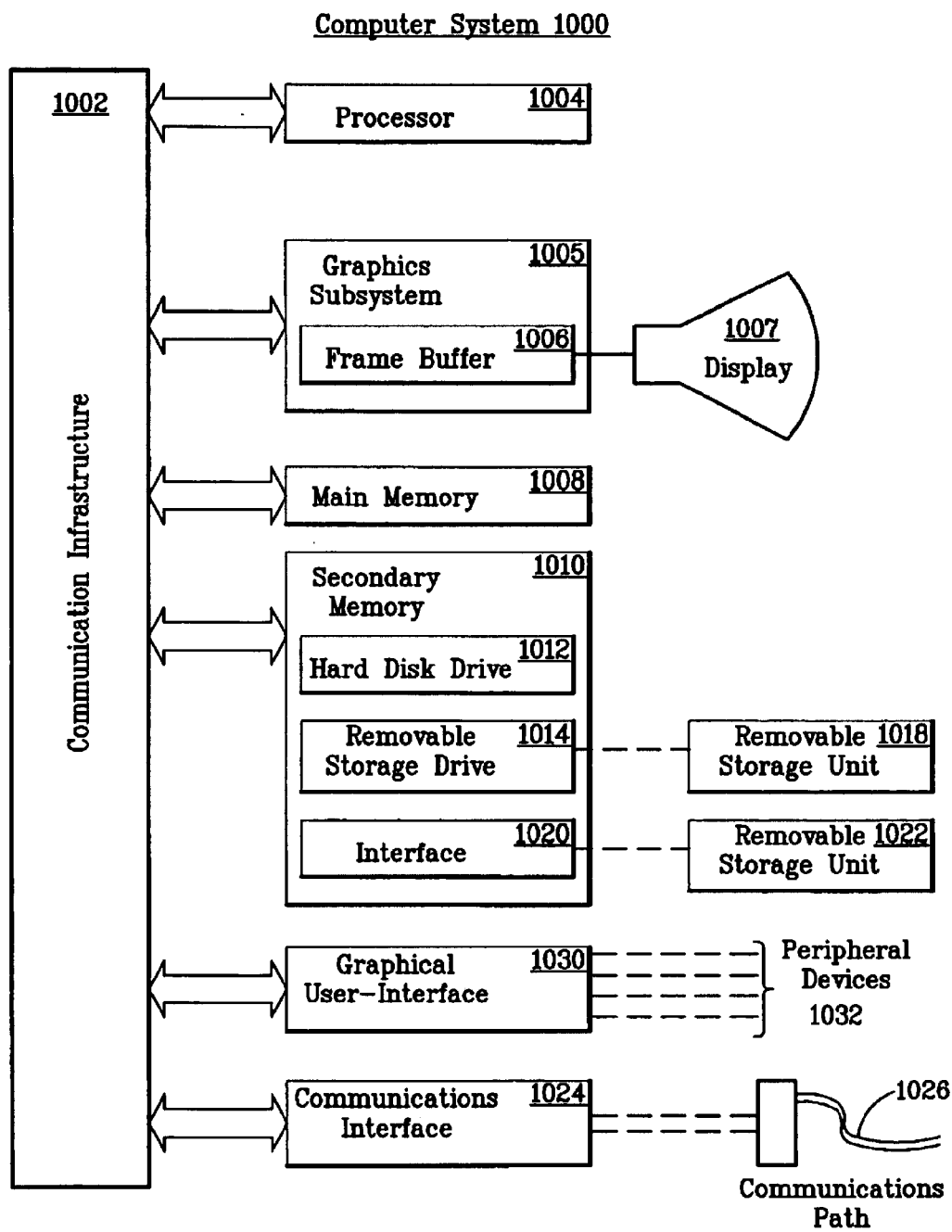
FIG. 10 illustrates an example computer system that can be used to practice various embodiments of the present invention.

Example Computer System for Implementing Computer Program Product Embodiments of the Invention Referring to FIG. 10, an example of a computer system 1000 is shown, which can be used to implement computer program product embodiments of the present invention. This example computer system is illustrative and not intended to limit the present invention. Computer system 1000 represents any single or multi-processor computer. Single-threaded and multi-threaded computers can be used. Unified or distributed memory systems can be used.

Computer system 1000 includes one or more processors, such as processor 1004, and one or more graphics subsystems, such as graphics subsystem 1005. One or more processors 1004 and one or more graphics subsystems 1005 can execute software and implement all or part of the features of the present invention described herein. Graphics subsystem 1005 can be implemented, for example, on a single chip as a part of processor 1004, or it can be implemented on one or more separate chips located on a graphic board. Each processor 1004 is connected to a communication infrastructure 1002 (e.g., a communications bus, cross-bar, or network). After reading this description, it will become apparent to a person skilled in the relevant art how to implement the invention using other computer systems and/or computer architectures.

Computer system 1000 also includes a main memory 1008, preferably random access memory (RAM), and can also include secondary memory 1010. Secondary memory 1010 can include, for example, a hard disk drive 1012 and/or a removable storage drive 1014, representing a floppy disk drive, a magnetic tape drive, an optical disk drive, etc. The removable storage drive 1014 reads from and/or writes to a removable storage unit 1018 in a well-known manner. Removable storage unit 1018 represents a floppy disk, magnetic tape, optical disk, etc., which is read by and written to by removable storage drive 1014. As will be appreciated, the removable storage unit 1018 includes a computer usable storage medium having stored therein computer software and/or data.

In alternative embodiments, secondary memory 1010 may include other similar means for allowing computer programs or other instructions to be loaded into computer system 1000. Such means can include, for example, a removable storage unit 1022 and an interface 1020. Examples can include a program cartridge and cartridge interface (such as that found in video game devices), a removable memory chip (such as an EPROM, or PROM) and associated socket, and other removable storage units 1022 and interfaces 1020 which allow software and data to be transferred from the removable storage unit 1022 to computer system 1000.

In an embodiment, computer system 1000 includes a frame buffer 1006 and a display 1007. Frame buffer 1006 is in electrical communication with graphics subsystem 1005. Images stored in frame buffer 1006 can be viewed using display 1007.

Computer system 1000 can also include a communications interface 1024. Communications interface 1024 allows software and data to be transferred between computer system 1000 and external devices via communications path

1026. Examples of communications interface 1024 can include a modem, a network interface (such is Ethernet card), a communications port, etc. Software and data transferred via communications interface 1024 are in the form of signals which can be electronic, electromagnetic, optical or other signals capable of being received by communications interface 1024, via communications path 1026. Note that communications interface 1024 provides a means by which computer system 1000 can interface to a network such as the Internet.

Computer system 1000 can include one or more peripheral devices 1032, which are coupled to communications infrastructure 1002 by graphical user-interface 1030. Example peripheral devices 1032, which can from a part of computer system 1000, include, for example, a keyboard, a pointing device (e.g., a mouse), a joy stick, and a game pad. Other peripheral devices 1032, which can form a part of computer system 1000 will be known to a person skilled in the relevant art given the description herein.

The present invention can be implemented using software running (that is, executing) in an environment similar to that described above with respect to FIG. 10. In this document, the term "computer program product" is used to generally refer to removable storage unit 1018, a hard disk installed in hard disk drive 1012, or a carrier wave or other signal carrying software over a communication path 1026 (wireless link or cable) to communication interface 1024. A computer useable medium can include magnetic media, optical media, or other recordable media, or media that transmits a carrier wave. These computer program products are means for providing software to computer system 1000.

Computer programs (also called computer control logic) are stored in main memory 1008 and/or secondary memory 1010. Computer programs can also be received via communications interface 1024. Such computer programs, when executed, enable the computer system 1000 to perform the features of the present invention as discussed herein. In particular, the computer programs, when executed, enable the processor 1004 to perform the features of the present invention. Accordingly, such computer programs represent controllers of the computer system 1000.

In an embodiment where the invention is implemented using software, the software may be stored in a computer program product and loaded into computer system 1000 using removable storage drive 1014, hard drive 1012, or communications interface 1024. Alternatively, the computer program product may be downloaded to computer system 1000 over communications path 1026. The control logic (software), when executed by the one or more processors 1004, causes the processor(s) 1004 to perform the functions of the invention as described herein.

In another embodiment, the invention is implemented primarily in firmware and/or hardware using, for example, hardware components such as application specific integrated circuits (ASICs). Implementation of a hardware state machine so as to perform the functions described herein will be apparent to a person skilled in the relevant art.

Conclusion

Various embodiments of the present invention have been described above, which are independent of image complexity and are capable of being implemented on an interactive graphics machine. It should be understood that these embodiments have been presented by way of example only, and not limitation. It will be understood by those skilled in the relevant art that various changes in form and details of the embodiments described above may be made without departing from the spirit and scope of the present invention as defined in the claims. Thus, the breadth and scope of the present invention should not be limited by any of the above-described exemplary embodiments, but should be defined only in accordance with the following claims and their equivalents.

What is claimed is:

1. A method for filtering a texture applied to a surface of a computer generated object, comprising the steps of:
   (a) receiving rendering data for a pixel of the object from an application program;
   (b) generating a first set of texture coordinates based on the rendering data received step (a);
   (c) obtaining a first texture sample from a texture image using the first set of texture coordinates generated in step (b);
   (d) storing the first texture sample in a frame buffer;
   (e) generating a second set of texture coordinates based on the rendering data received in step (a), the second set of texture coordinates being offset from the first set of texture coordinates, such that the location of each set of texture coordinates is displaced from the other sets of texture coordinates based upon projected screen space derivatives to assemble a texel footprint;
   (f) obtaining a second texture sample from the texture image using the second set of texture coordinates generated in step (e), the second texture sample being different from the first texture sample;
   (g) blending the second texture sample with the first texture sample to produce a texture sample having a greater degree of filtering;
   (h) storing the texture sample produced in step (g) in the frame buffer; and
   (i) repeating steps (a) through (h) for at least one additional pixel of the object.

2. The method of claim 1, wherein steps (b) through (d) are performed in a first pass through a graphics pipeline, and wherein steps (e) through (h) are performed in a second pass through the graphics pipeline.

3. The method of claim 2, wherein steps (e) through (h) are performed for at least one additional unique set of texture coordinates for a pixel of step (a), and wherein steps (e) through (h) are performed in at least one additional pass through the graphics pipeline.

4. The method of claim 1, wherein steps (b) and (c) are performed in a first texture unit and steps (f) and (g) are performed in a second texture unit, the first texture unit operating in parallel with the second texture unit, and wherein steps (d) and (h) comprise the single step of blending according to a blending factor the output of the first and second texture units to produce a texture sample having a greater degree of filtering.

5. The method of claim 4, wherein steps (b) and (c) and steps (f) and (g) are performed for additional unique sets of texture coordinates for the pixel of step (a) in at least one additional pass through the graphics pipeline.

6. The method of claim 1, wherein step (c) and step (f) each comprise the step of obtaining a bilinearly filtered texture sample.

7. The method of claim 1, wherein step (c) and step (f) each comprise the step of obtaining a trilinearly filtered texture sample.

8. The method of claim 1, wherein step (a) comprises the step of receiving data that represents a number of graphics pipeline passes.

9. The method of claim 8, wherein step (a) further comprises the step of receiving a maximum allowed degree of anisotropy.

10. The method of claim 1, wherein step (b) and step (e) each comprise the step of generating a set of texture coordinates for the pixel of step (a) that represents a texture sample that lays alone a line that approximates the direction of maximum anisotropy.

11. A system for filtering a texture applied to a surface of a computer generated object, comprising:

a receiving module for receiving rendering data for the object from an application program;

a texture coordinate generating module for generating a set of offset texture coordinates for a pixel of the object based on an output of said receiving module, such that the location of each set of texture coordinates is displaced from the other sets of texture coordinates based upon projected screen space derivatives to assemble a texel footprint;

a texture sampling module for obtaining a first texture sample from a texture image based on an output of said texture coordinate generating module;

a frame buffer capable of storing said first texture sample; and a blending module capable of blending output of said texture sampling module with said first texture sample stored in said frame buffer, the output of said texture sampling module comprising a second texture sample different from the first texture sample.

12. The system of claim 11, wherein said output of said texture sampling module is a bilineraly filtered texture sample.

13. The system of claim 11, wherein said output of said texture sampling module is a trilinearly filtered texture sample.

14. The system of claim 11, wherein said output of said texture sampling module is an anisotropicly filtered texture sample.

15. The system of claim 11, wherein said texture sampling module comprises at least two texture units capable of operating in parallel.

16. A computer program product comprising a computer readable medium having computer program logic recorded thereon for enabling a processor to filter a texture applied to a surface of a computer generated object, said computer program logic comprising:

a receiving procedure that enables a processor to receive rendering data for a pixel of the object from an application program;

a coordinate generating procedure that enables the processor to generate a first set of texture coordinates for the pixel using an output of said receiving procedure, the location of the texture coordinates being displaced from other sets of texture coordinates based upon projected screen space derivatives to assemble a texel footprint;

a texture sampling procedure that enables a processor to obtain a first texture sample from a texture image based on an output of said coordinate generating procedure;

a storing procedure that enables the processor to store said first texture sample in a frame buffer; and a blending procedure that enables a processor to blend said first texture sample stored in said frame buffer with an output of said texture sampling procedure, the output of said texture sampling procedure comprising a second texture sample different from the first texture sample.

17. The computer program product of claim 16, wherein said output of said texture sampling procedure is a bilinearly filtered texture sample.

18. The computer program product of claim 16, wherein said output of said texture sampling procedure is a trilinearly filtered textured sample.

19. The computer program product of claim 16, wherein at least one of said procedures is a graphics application programming interface that enables the processor to control the operation of a texture unit.

20. The computer program product of claim 16, wherein at least one of said procedures is capable of being implemented by an application program running on a host system.

* * * * *